(12) United States Patent
Matsumoto et al.

(10) Patent No.: US 10,370,896 B2
(45) Date of Patent: Aug. 6, 2019

(54) JOINED UNIT OF GLASS BASE MEMBERS, AND AIRTIGHT ENVELOPE

(71) Applicant: CANON KABUSHIKI KAISHA, Tokyo (JP)

(72) Inventors: Mamo Matsumoto, Hiratsuka (JP); Tomohiro Saito, Kouza-gun (JP); Matsutaka Maeda, Kawasaki (JP); Nobuhiro Ito, Yamato (JP); Toshitami Hara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1638 days.

(21) Appl. No.: 13/688,324

(22) Filed: Nov. 29, 2012

(65) Prior Publication Data
US 2013/0171380 A1    Jul. 4, 2013

Related U.S. Application Data

(62) Division of application No. 12/911,183, filed on Oct. 25, 2010, now abandoned.

(30) Foreign Application Priority Data

Oct. 30, 2009  (JP) .................................. 2009-250277
Mar. 16, 2010  (JP) .................................. 2010-059377
Sep. 7, 2010   (JP) .................................. 2010-200173

(51) Int. Cl.
*B32B 3/26*      (2006.01)
*B32B 17/00*     (2006.01)
(Continued)

(52) U.S. Cl.
CPC ................ *E06B 5/00* (2013.01); *B32B 3/263* (2013.01); *C03C 27/06* (2013.01); *Y10T 428/24562* (2015.01)

(58) Field of Classification Search
CPC ......... C03C 27/06; C03C 27/10; B32B 17/00; B32B 17/06; B65D 13/02
(Continued)

(56) References Cited

U.S. PATENT DOCUMENTS 5,489,321 A    2/1996  Tracy et al.
5,820,435 A   10/1998  Cooper et al.
(Continued)

FOREIGN PATENT DOCUMENTS

CA    2 279 794 A1    2/2000
CN    1798710 A       7/2006
(Continued)

OTHER PUBLICATIONS

Hirai Masazumi, "Estimation of Viscosities of Liquid Alloys," ISIJ, vol. 78, No. 3, 1992, pp. 339-406.
(Continued)

*Primary Examiner* — Joanna Pleszczynska
(74) *Attorney, Agent, or Firm* — Venable LLP

(57) ABSTRACT

A joined unit of glass base members is provided, comprising first and second glass base members and a joining member which extends along opposing surfaces of the first and second glass base members, wherein glass base member is elastically deformed while being depressed in an internal direction of the glass base member in the vicinity of an end portion in a widthwise direction of the joining member, a boundary surface between the elastically deformed glass base member and the joining member and a surface of the elastically deformed glass base member, which are disposed in the vicinity of the end portion in the widthwise direction of the joining member, are positioned on an internal side of the glass base member, and an area, in which a residual stress is a compressive stress, is formed in the vicinity of the end portion in the widthwise direction of the joining member.

5 Claims, 16 Drawing Sheets

(51) Int. Cl.
*B32B 17/06* (2006.01)
*H05K 5/06* (2006.01)
*E06B 5/00* (2006.01)
*C03C 27/06* (2006.01)

(58) Field of Classification Search
USPC .................................. 428/34, 426, 432, 428
See application file for complete search history.

(56) References Cited

U.S. PATENT DOCUMENTS

| | | |
|---|---|---|
| 6,501,044 B1 | 12/2002 | Klockhaus et al. |
| 6,998,776 B2 | 2/2006 | Aitken et al. |
| 8,089,204 B2 | 1/2012 | Ito |
| 8,115,391 B2 | 2/2012 | Kimura et al. |
| 2003/0066311 A1 | 4/2003 | Li et al. |
| 2004/0207314 A1 | 10/2004 | Aitken et al. |
| 2007/0128966 A1 | 6/2007 | Becken et al. |
| 2008/0171485 A1 | 7/2008 | Choi et al. |
| 2009/0199963 A1 | 8/2009 | Ohashi et al. |
| 2009/0205849 A1 | 8/2009 | Kimura et al. |

FOREIGN PATENT DOCUMENTS

| | | |
|---|---|---|
| EP | 0 978 489 A2 | 2/2000 |
| JP | 2000-313630 A | 11/2000 |
| JP | 2003-286048 A | 10/2003 |
| JP | 2006-315902 A | 11/2006 |
| JP | 2007-052939 A | 3/2007 |
| JP | 2009-199758 A | 9/2009 |

OTHER PUBLICATIONS

European Search Report dated Apr. 5, 2011, in related European Patent Application No. 10186788.5.
Chinese Office Action dated Feb. 13, 2012, in related Chinese Patent Application No. 201010519901.3.

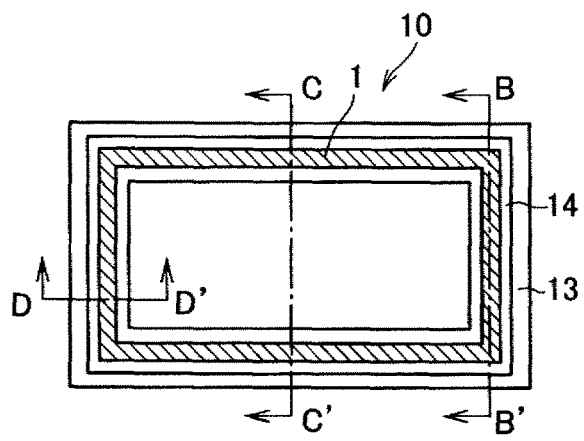
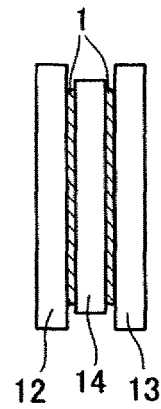
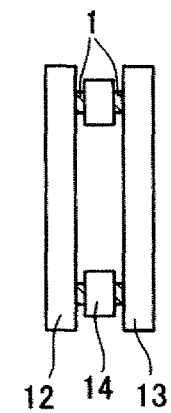
Fig.1A   Fig.1B   Fig.1C
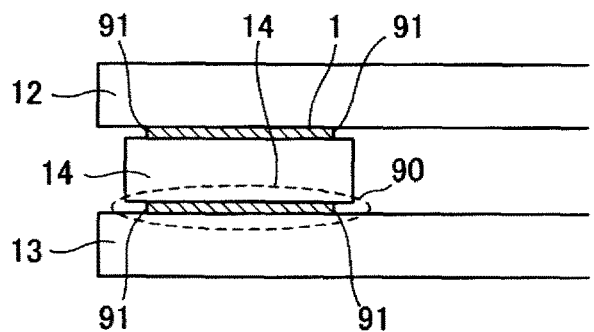
Fig.1D
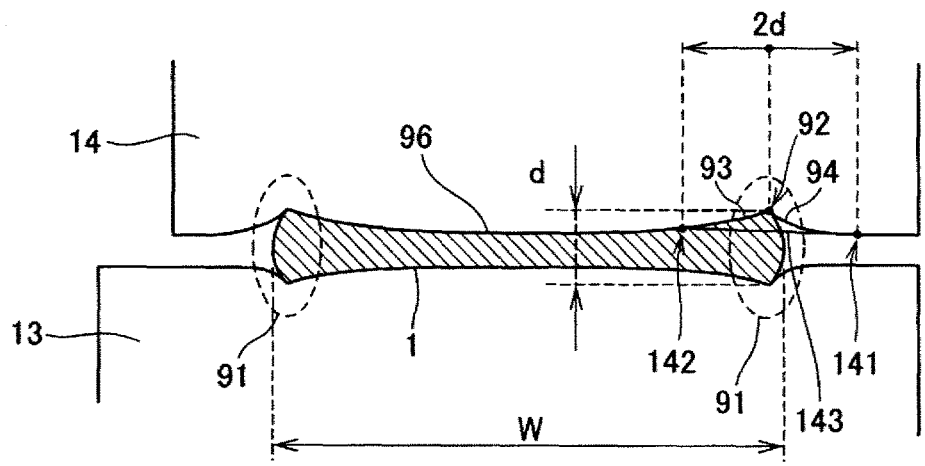
Fig.1E

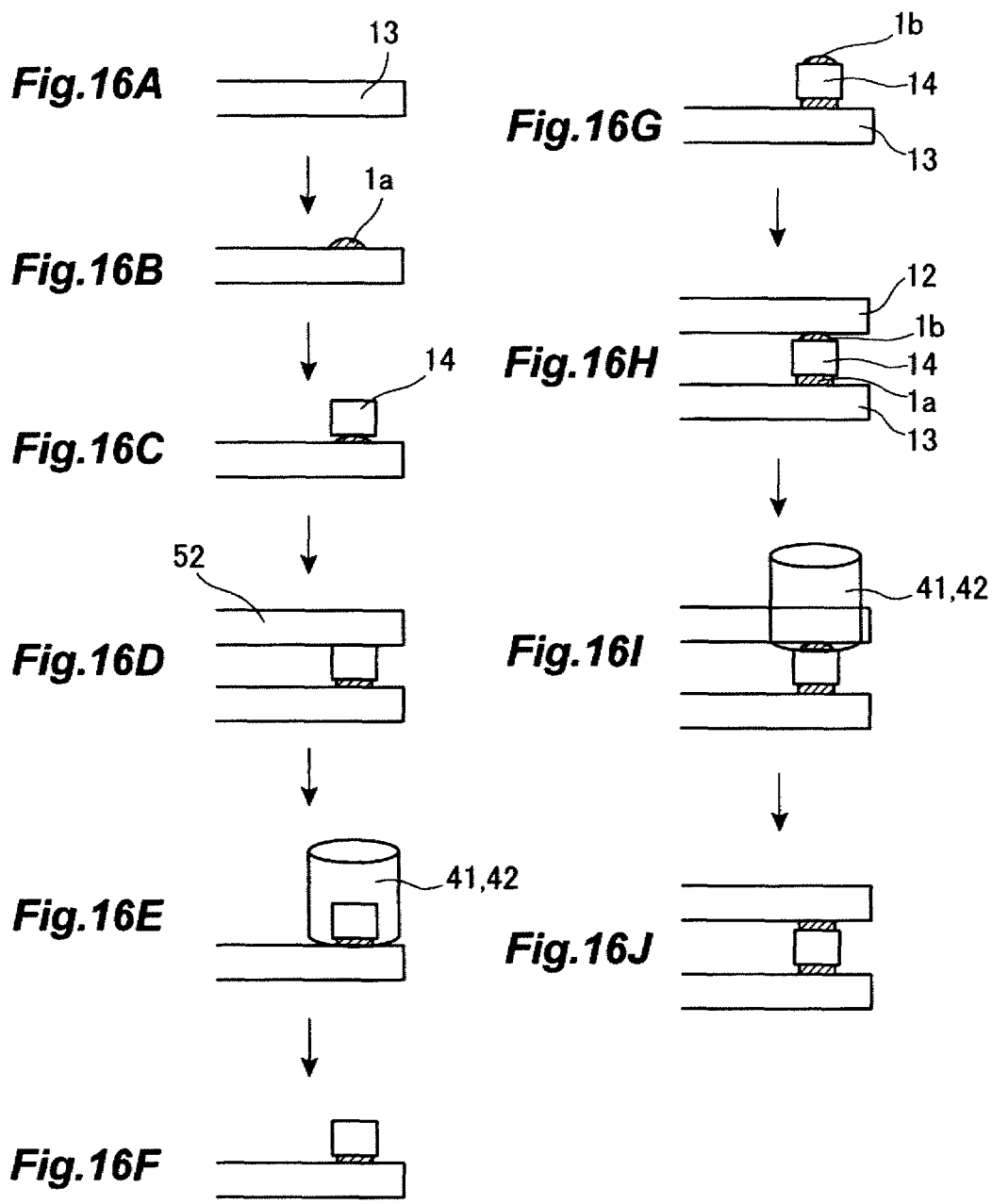

JOINED UNIT OF GLASS BASE MEMBERS, AND AIRTIGHT ENVELOPE

This application is a divisional of application Ser. No. 12/911,183, filed Oct. 25, 2010.

BACKGROUND OF THE INVENTION

Field of the Invention

The present invention relates to a joined unit of glass base members, an airtight envelope, and a method for producing a glass structural unit. The present invention is applicable especially preferably to an envelope of, for example, a display which includes a device therein and a method for producing the same, wherein it is feared for the device that the performance may be deteriorated by the invasion of any gas such as oxygen, water or the like.

Description of the Related Art

A technique has been hitherto known, in which opposing glass base members are joined to one another in an airtight manner to form an internal space having the airtightness. This technique is applied to a method for producing an airtight envelope of a flat panel including, for example, the vacuum heat insulating glass, the organic LED display (OLED), the field emission display (FED), and the plasma display panel (PDP). When the airtight envelope as described above is produced, then a joining material is arranged at circumferential edge portions of glass base members, and the glass base members are joined to one another, for example, by means of the heating, provided that a spacing distance defining member, a local adhesive and the like are arranged between the opposing glass base members, if necessary. A method has been suggested as a method for mutually joining the glass base members, wherein an assembly, which is obtained by temporarily assembling the glass base members, is entirely heated (baked) as a whole by means of a heating furnace. Another method has been also suggested, wherein only the circumferential edge portions of the assembly are selectively heated by a local heating means. The local heating is more advantageous than the whole heating in view of the heating and cooling time, the reduction of the energy required for the heating, and the prevention of any thermal deterioration of the functional device contained in the case.

United States Patent Application Publication No. 2008/0171485 discloses an example in which the airtight joining using the laser beam is applied to a method for producing an envelope of OLED by making use of the advantage of the local heating. In this production method, a frit, which is arranged between two glass base members, is firstly heated and melted by a first laser beam to join the glass base members to one another. Subsequently, a second laser beam is radiated onto the joined area to anneal the joined area. Owing to the anneal effect brought about by the second laser beam, the occurrence of any glass breakage, which would be otherwise caused in any inappropriate direction during a cutting step to be performed thereafter, is avoided.

Japanese Patent Application Laid-open No. 2003-286048 discloses a technique in which the breaking strength or fracture strength of a glass base member is enhanced by a laser beam having an extremely short pulse width. In this technique, a heterogeneous phase is formed in the glass base member by radiating the laser beam having the extremely short pulse width onto the glass base member. The heterogeneous phase is a compressive stress layer which is formed in the vicinity of the surface of the glass base member. The strength of the glass base member is enhanced by the formation of the compressive stress layer formed in the vicinity of the surface of the glass base member.

U.S. Pat. No. 5,820,435 discloses a method for producing an envelope of FED. In this production method, a frame member and a joining material (frit) are firstly arranged at circumferential edge portions of a first glass base member and a second glass base member which are arranged oppositely. Subsequently, a laser beam is intermittently radiated along with a direction in which the joining material extends so that the discrete partial joining is obtained. Subsequently, the laser beam is continuously radiated onto the entire circumference of the joining material including the partially joined area so that the continuous airtight joining is obtained.

Japanese Patent Application Laid-open No. 2000-313630 discloses a method for producing fused glass. In this production method, a joining material (frit) is firstly arranged at circumferential edge portions of a first glass base member and a second glass base member which are arranged oppositely. Subsequently, a light source, in which local heating light sources for the pre-heating, the joining, and the gradual cooling are arranged closely to one another in this order, is used to continuously radiate a laser beam onto the entire circumference of the joining material while performing the scanning so that the continuous airtight joining is obtained. The laser radiation is performed in the three stages for the purpose of the pre-heating, the joining, and the gradual cooling. Therefore, the temperature distribution of the radiation objective is gentle, and it is easy to avoid the crack. In the pre-heating stage, the joining material is heated to a temperature which is less than the glass fusion temperature. Therefore, any fusion of glass is not caused.

Japanese Patent Application Laid-open No. 2006-315902 discloses a method for joining two substrates of a display apparatus. In this joining method, a sealing material is firstly arranged at circumferential edge portions of a first glass substrate and a second glass substrate which are arranged oppositely. Subsequently, a first laser beam, which has a wide radiation range and which is capable of simultaneously heating the sealing material and the substrates disposed therearound, is radiated simultaneously with a second laser beam which has a narrow radiation range and which has a high absorptance or absorption factor with respect to the sealing material. The first laser beam has the wider radiation range. Therefore, the sealing material is firstly heated by the first laser beam to such an extent that the sealing material is not melted. After that, the sealing material is heated and melted by the second laser beam.

United States Patent Application Publication No. 2007/0128966 discloses a method for joining two substrates of a display apparatus. In this joining method, a second substrate is arranged so that the second substrate is brought in contact with a joining material (frit) arranged on a first substrate. A laser beam is radiated onto the joining material while performing the scanning at a velocity of 5 mm/s to 300 mm/s. Thus, the two substrates are joined to one another.

SUMMARY OF THE INVENTION

In a joined unit of glass base members, when the external force acts on a joining member which joins the glass base members to one another, then any crack appears in the joining member, and the strength of the joining member is lowered in some cases. In the case of an airtight envelope which is constructed by the joined unit of glass base members, the decrease in the strength of the joining member results in the long-term decrease in the reliability of the airtightness. When the airtight envelope is used for a display apparatus, any influence is exerted on the stable operation of the display apparatus in some cases.

The external force, which acts on the joined unit of glass base members such as the airtight envelope for the display apparatus or the like, is exemplified by the external force which is caused by the vibration and/or the pressure fluctuation or variation. For example, an airtight envelope, which is produced in a pressure environment of 1 atmosphere, is exposed to a low pressure environment of about 0.2 atmosphere when the airtight envelope is transported by air. The airtight envelope, which is shipped to a region of the high height above sea level, is sometimes used in a low pressure environment of about 0.6 atmosphere. In this way, when the airtight envelope is exposed to the pressure environment of the pressure lower than that of the pressure environment in which the production is performed, then the pressurization, which is exerted on the airtight envelope by the pressure of the external space, is decreased, and the joining member of the airtight envelope undergoes the occurrence of the decrease in the compressive stress and/or the increase in the tensile stress in some cases. In such a situation, any crack tends to appear in the joining member, and the crack, which appears in the joining member, tends to develop in the joining member. For this reason, the decrease in the strength of the joining member and/or the decrease in the airtightness is/are caused with ease.

In view of the above, the present invention provides a technique which makes it possible to suppress the occurrence of any crack in a joining member by the external force in a joined unit of glass base members including a pair of glass base members joined by the joining member.

The present invention is a joined unit of glass base members, comprising:
a first glass base member;
a second glass base member; and
a joining member which joins the first glass base member and the second glass base member, which is capable of providing a viscosity that has a negative temperature coefficient, and which extends at a predetermined width along opposing surfaces of the first glass base member and the second glass base member, wherein:
at least one of the first glass base member and the second glass base member is elastically deformed while being depressed in an internal direction of the glass base member in the vicinity of an end portion in a widthwise direction of the joining member;
a boundary surface between the elastically deformed glass base member and the joining member and a surface of the elastically deformed glass base member, which are disposed in the vicinity of the end portion in the widthwise direction of the joining member, are positioned on an internal side of the glass base member as compared with a boundary surface between the elastically deformed glass base member and the joining member which is disposed in the vicinity of a central portion in the widthwise direction of the joining member; and
an area, in which a residual stress in a thickness direction of the joining member is a compressive stress, is formed in the vicinity of the end portion in the widthwise direction of the joining member.

The present invention is an airtight envelope comprising:
a first glass base member;
a second glass base member; and
a joining member which joins the first glass base member and the second glass base member, which is capable of providing a viscosity that has a negative temperature coefficient, and which extends at a predetermined width along opposing surfaces of the first glass base member and the second glass base member, wherein:
at least one of the first glass base member and the second glass base member is elastically deformed while being depressed in an internal direction of the glass base member in the vicinity of an end portion in a widthwise direction of the joining member;
a boundary surface between the elastically deformed glass base member and the joining member and a surface of the elastically deformed glass base member, which are disposed in the vicinity of the end portion in the widthwise direction of the joining member, are positioned on an internal side of the glass base member as compared with a boundary surface between the elastically deformed glass base member and the joining member which is disposed in the vicinity of a central portion in the widthwise direction of the joining member; and
an area, in which a residual stress in a thickness direction of the joining member is a compressive stress, is formed in the vicinity of the end portion in the widthwise direction of the joining member.

The present invention is a method for producing a glass structural unit, including joining a first glass base member and a second glass base member for forming at least a part of the glass structural unit together with the first glass base member, the method comprising:
a step of arranging a joining member between the first glass base member and the second glass base member so that the joining member is brought in contact with both of the first glass base member and the second glass base member, the joining member being capable of providing a viscosity which has a negative temperature coefficient, and the joining member extending at a predetermined width along opposing surfaces of the first glass base member and the second glass base member;
a step of pressing the joining member in a thickness direction of the joining member; and
a first joining step of radiating a first local heating light beam onto the joining member via the first glass base member so that a radiation position is moved in a direction in which the joining member extends, heating and melting the joining member in an entire region in a widthwise direction, and then cooling the joining member to a temperature of not more than a softening point, wherein:
the following expressions are fulfilled by a velocity of movement v (m/s) of the radiation position brought about by the first local heating light beam and a beam diameter $\phi$ (m) of the first local heating light beam provided that d (m) represents a thickness of the first glass base member, a ($m^2$/s) represents a thermal diffusivity of the first glass base member, and w (m) represents the width of the joining member:

$$\phi/v < (d/8)^2/(12a) \qquad \text{(Expression 1)}$$

$$\phi > w \qquad \text{(Expression 2)}$$

According to the present invention, it is possible to suppress the occurrence of any crack in the joining member by the external force in the joined unit of glass base members including the pair of glass base members joined by the joining member.

Further features of the present invention will become apparent from the following description of exemplary embodiments with reference to the attached drawings.

BRIEF DESCRIPTION OF THE DRAWINGS

FIGS. 1A, 1B, 1C, 1D and 1E show a schematic arrangement of an airtight envelope according to an embodiment.

FIGS. 16A, 16B, 16C, 16D, 16E, 16F, 16G, 16H, 16I and 16J show a method for producing an airtight envelope concerning Example 5.

DESCRIPTION OF THE EMBODIMENTS

An embodiment of the present invention will be explained below. The joined unit of glass base members and the airtight envelope of the present invention are preferably applicable to an envelope of, for example, FED, OLED, and PDP. The envelope includes, in the internal space, a device which is required to be shut off in an airtight manner from the external atmosphere. The method for producing the glass structural unit of the present invention is applicable to the production of an envelope of, for example, FED, OLED, and PDP. The envelope includes, in the internal space, a device which is required to be shut off in an airtight manner from the external atmosphere. In particular, in the case of the airtight envelope of the envelope for the image display apparatus such as FED or the like, the inside or interior is a pressure-reduced space. Therefore, the airtight envelope receives the load of the atmospheric air on account of the negative pressure of the internal space. Any crack appears in the airtight joined portion due to the load of the atmospheric air in some cases. The crack as described above sometimes deteriorates the long-term reliability of the airtightness of the airtight envelope. According to the method for producing the glass structural unit of the present invention, it is possible to obtain the airtight envelope having the high long-term reliability of the airtightness. It is noted that the method for producing the glass structural unit of the present invention is not limited to the production of the airtight envelope in which the inside is the pressure-reduced space and the production of the airtight envelope in which the circumferential edge portions of the opposing glass base members are joined by the joining member for which the airtightness is required. The method for producing the glass structural unit of the present invention is widely applicable to the production of any general glass structural unit in which glass base members are joined to one another by a joining member. Accordingly, it is possible to obtain the glass structural unit in which any crack hardly appears in the joining member against the external force.

Figure 10:
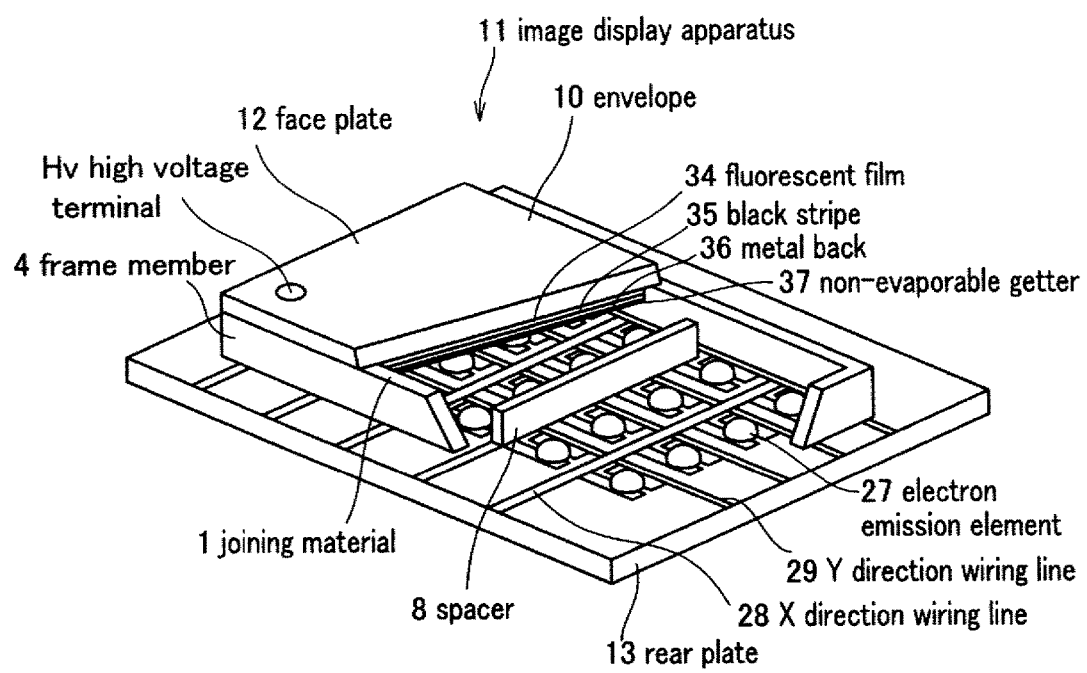
FIG. 10 shows, with partial cutaway, a perspective view illustrating FED including the airtight envelope according to an embodiment.

FIG. 10 shows, with partial cutaway, a perspective view illustrating an image display apparatus (FED) including an airtight envelope according to an embodiment of the present invention. An envelope 10 (airtight envelope) of the image display apparatus 11 has a face plate 12, a rear plate 13, and a frame member 14 each of which is made of glass. The frame member 14 is positioned between the face plate 12 and the rear plate 13 which are flat plate-shaped respectively. A hermetically closed space is formed between the face plate 12 and the rear plate 13. Specifically, the envelope 10, which has the hermetically closed internal space, is formed by joining the mutually opposing surfaces of the face plate 12 and the frame member 14 to one another and joining the mutually opposing surfaces of the rear plate 13 and the frame member 14 to one another. The internal space of the envelope 10 is maintained in vacuum. Spacers 8, which are the spacing distance defining members, are provided at predetermined pitches between the face plate 12 and the rear plate 13. The face plate 12 and the frame member 14 may be previously joined or integrally formed, or the rear plate 13 and the frame member 14 may be previously joined or integrally formed.

A large number of electron emission elements 27, which emit electrons in accordance with the image signal, are provided on the rear plate 13. Driving matrix wiring lines (X direction wiring lines 28, Y direction wiring lines 29), which are provided to operate the respective electron emission elements 27 in accordance with the image signal, are formed on the rear plate 13. Fluorescent films 34 are provided on the face plate 12 which is positioned oppositely to the rear plate 13. The fluorescent film 34 is composed of a fluorescent substance which emits the light by receiving the radiation of the electrons emitted from the electron emission elements 27 so that an image is displayed. Further, black stripes 35 are provided on the face plate 12. The fluorescent films 34 and the black stripes 35 are provided while being arranged alternately. A metal back 36, which is composed of an Al thin film, is formed on the fluorescent film 34. The metal back 36 has a function as an electrode to attract the electrons, and the electric potential is supplied thereto from a high voltage terminal Hv provided for the envelope 10. A non-evaporable getter 37, which is composed of a Ti thin film, is formed on the metal back 36.

It is appropriate that the face plate 12, the rear plate 13, and the frame member 14 are transparent and light-transmissive. Those usable include, for example, soda-lime glass, high strain point glass, and non-alkali glass or alkali-free glass. It is desirable that these members have the satisfactory wavelength transmissivity at the usable wavelength of the local heating light beam and in the absorptive wavelength range of the joining material as described later on.

Next, the joined unit of glass base members, the airtight envelope, and the method for producing the glass structural unit according to the embodiment of the present invention will be explained with reference to the drawings.

FIG. 1 shows a schematic arrangement of the envelope 10 of the image display apparatus 11. FIG. 1A shows the envelope 10 as viewed in a direction perpendicular to the face plate 12. In FIG. 1A, the face plate 12 is omitted from the illustration. FIG. 1B shows a sectional view illustrating the envelope 10 taken along a line BB shown in FIG. 1A. FIG. 1C shows a sectional view illustrating the envelope 10 taken along a line CC shown in FIG. 1A. FIG. 1D shows a sectional view illustrating the envelope 10 taken along a line DD shown in FIG. 1A. FIG. 1E shows an enlarged view illustrating a portion 90 surrounded by a broken line shown in FIG. 1D.

As shown in FIG. 1E, the joining member 1, which joins the rear plate 13 and the frame member 14, has end portions 91 in the widthwise direction which are allowed to bite into the rear plate 13 (first glass base member) and the frame member 14 (second glass base member). An explanation will be made as exemplified by the end portion 91 of the joining member and the glass base member 14 (frame member) disposed on the right side in FIG. 1E by way of example. The glass base member 14 is deformed while being depressed in the internal direction of the glass base member 14 in the vicinity of the end portion 91 of the joining member.

In this description, the surface of the glass base member 14, which is disposed in the vicinity of the end portion 91 of the joining member, is designated as "surface 94". The boundary surface of the portion, at which the joining member 1 and the glass base member 14 are brought in contact with each other in the vicinity of the end portion 91 of the joining member, is designated as "boundary surface 93". The boundary surface of the portion, at which the joining member 1 and the glass base member 14 are brought in contact with each other in the vicinity of the central portion in the widthwise direction of the joining member 1, is designated as "boundary surface 96". In this arrangement, the surface 94 and the boundary surface 93 are positioned on the internal side of the glass base member 14 as compared with the boundary surface 96.

The thickness of the joining member, which is provided at the maximum thickness portion 92 of the end portion 91 of the joining member, is designated as "d". The positions, at which the distance in the widthwise direction of the joining member 1 is d from the maximum thickness portion 92 on the surface of the glass base member 14, are designated as "positions 141, 142". A virtual boundary line, which is obtained by connecting the positions 141, 142 with a straight line, is designated as "boundary line 143". In this arrangement, the boundary surface 93 and the surface 94 are disposed on the internal side of the glass base member of the glass base member 14 as compared with the virtual boundary line 143.

The deformation of the glass base member 14 described above, which is brought about in the vicinity of the end portion 91 of the joining member, is the elastic deformation. The glass base member 14 is depressed or forcibly recessed toward the inside of the base member to cause the elastic deformation in the vicinity of the end portion 91 of the joining member. Accordingly, the compressive stress is generated in the glass base member 14 in the vicinity of the end portion 91 of the joining member. The compressive stress acts as the driving force, and the glass base member 14 presses the end portion 91 of the joining member against the glass base member 13 (rear plate).

Similarly, the compressive stress, which is generated in the glass base member 13 in the vicinity of the end portion 91 of the joining member, acts as the driving force, and the glass base member 13 presses the end portion 91 of the joining member against the glass base member 14.

In this way, the end portion 91 of the joining member is compressed in accordance with the action in which at least one of the opposing glass base members presses the end portion 91 of the joining member against the other glass base member. Therefore, the end portion 91 of the joining member provides the compressive stress area. That is, in the embodiment of the present invention, the compressive stress areas are formed at the both end portions in the widthwise direction of the joining member 1 for joining the glass base members to one another.

The driving force of the action to compress the end portion 91 of the joining member by the glass base member is the compressive stress generated in the glass base member. The driving force is inherent in the glass base member itself for constructing the airtight envelope. Therefore, the action to compress the end portion 91 of the joining member by the glass base member sustainably remains irrelevant to, for example, the pressure fluctuation or variation provided outside the airtight envelope.

Any crack, which is caused by the external force, hardly arises in the joining member 1 owing to the fact that the areas of the compressive stress are formed at the both end portions 91 of the joining member 1. Therefore, the appearance of the crack in the joining member 1 is suppressed irrelevant to, for example, the pressure fluctuation or variation caused during the movement or the transport of the airtight envelope and the difference in the pressure environment between the production and the use. Therefore, the airtight envelope, which has the high long-term reliability of the airtightness, is obtained.

The crack, which is caused by the external force, hardly appears in the joining member when the glass base member is elastically deformed toward the internal side of the glass base member in the vicinity of the end portions disposed on the both sides of the joining member and the areas of the compressive stress are formed at the end portions disposed on the both sides of the joining member in any general joined unit of glass base members without being limited to the airtight envelope. Therefore, the joined unit of glass base members, which is excellent in the strength, is obtained.

As for the glass base member to be used for the airtight envelope in the present invention, it is desirable to use those in which the outgassing is scarcely caused from the glass base member itself. When the airtight envelope of the present invention is used for the display apparatus such as FED, OLED or the like, those preferably usable as the glass base member of the airtight envelope include non-alkali glass or alkali-free glass, borosilicate glass, and high strain point glass, in view of the chemical and thermal stability against, for example, the temperature fluctuation during the operation of the apparatus.

As for the joining material to be used for the airtight envelope of the present invention, it is desirable to use those in which the outgassing is scarcely caused from the joining material itself. When the airtight envelope of the present invention is used for the display apparatus such as FED, OLED or the like, those preferably usable as the joining material include, for example, glass frit, inorganic adhesive, and low melting point glass, in view of the chemical and thermal stability against, for example, the temperature fluctuation during the operation of the apparatus.

Figure 2A:
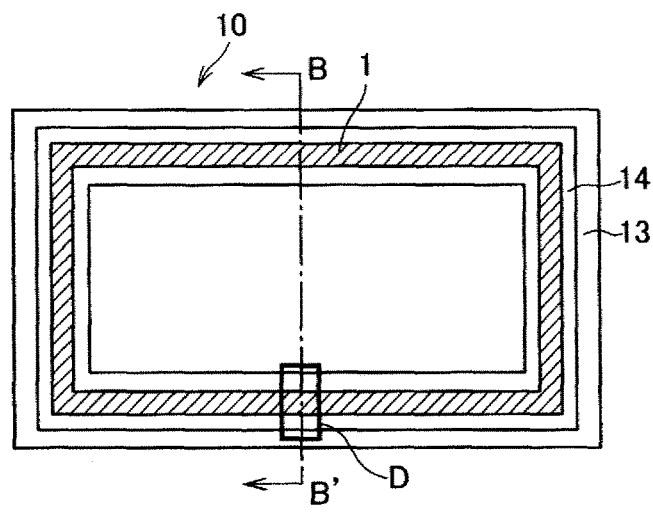
FIGS. 2A, 2B, 2C, 2D and 2E illustrate a method for confirming the elastic deformation of glass base members.
Figure 2B:
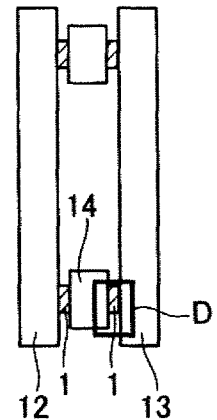
Figure 2C:
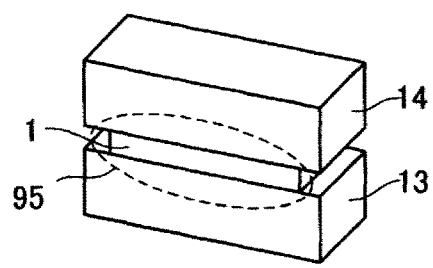
Figure 2D:
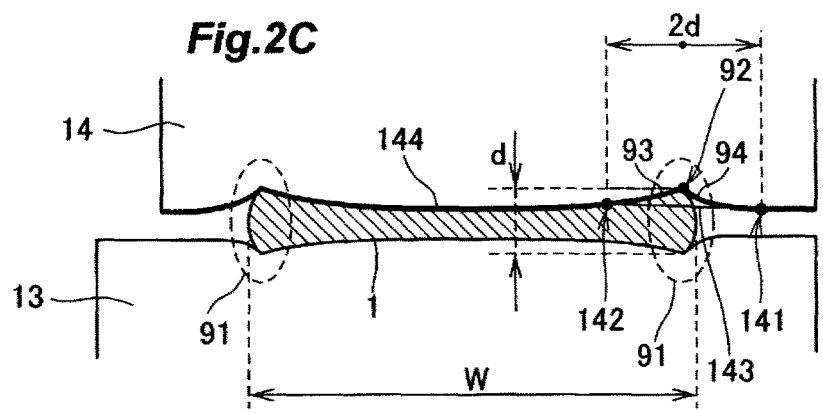
Figure 2E:
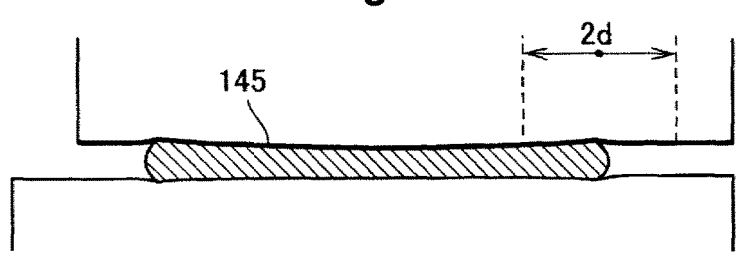

Next, an explanation will be made in detail by using FIG. 2 about an example of a method for confirming whether or not the joined unit of glass base members satisfies the requirement of the present invention. FIG. 2 shows a schematic arrangement of the envelope 10 of the image display apparatus 11. FIG. 2A shows the envelope 10 (airtight envelope) as viewed in a direction perpendicular to the face plate 12. FIG. 2B shows a sectional view illustrating the airtight envelope taken along a line BB' shown in FIG. 2A. FIG. 2C shows a perspective view illustrating a sample or specimen obtained by cutting out a portion surrounded by thick frame lines D shown in FIGS. 2A and 2B. FIGS. 2D and 2E show enlarged views illustrating the portion 95 of the joining member 1 in relation to the sample shown in FIG. 2C.

At first, the sample including the joining member 1 is cut out from the airtight envelope. As shown in FIG. 2C, the sample is cut out in a sandwich form in which the joining member 1 is interposed between the pair of glass base members (frame member 14, rear plate 13). The method for cutting out the sample from the airtight envelope is not specifically limited. However, it is appropriate to adopt such a method that the joined surface is smooth and the joining strength is not lowered as far as possible. The sample can be cut out by using, for example, a dicing cutter or FIB (Focused Ion Beam). The cutting portion may be previously reinforced with resin prior to the cutting, if necessary. The thickness between cutting surfaces can be about 100 µm to several mm.

Subsequently, the temperature of the prepared sample is adjusted to room temperature or a temperature which is coincident with the assumed environment of use of the airtight envelope. Subsequently, the shape 144 is obtained for the surface of the glass base member and the boundary surface between the joining member 1 and the glass base member on the cutting surface by means of, for example, an optical microscope or a scanning electron microscope. The height of the surface of the glass base member and the height of the boundary surface between the joining member 1 and the glass base member are plotted with respect to the position in the widthwise direction of the joining member 1. Thus, the shape 144 (hereinafter referred to as "boundary shape") is specified for the surface of the glass base member and the boundary surface between the joining member 1 and the glass base member (FIG. 2D).

Subsequently, the sample is heated by means of an unillustrated heating apparatus so that the temperature of the sample is not less than the softening point temperature of the joining material. The temperature of the sample is maintained at a temperature of not less than the softening point temperature of the joining material for about 10 minutes, and then the sample is cooled to the temperature (room temperature or the temperature of the assumed environment of the use of the airtight envelope 10) at which the boundary shape 144 has been obtained. A boundary shape 145 of the glass base member is specified in the same manner as in the method for obtaining the boundary shape 144 before the heating (FIG. 2E).

The obtained boundary shapes 144, 145 of the glass base member are compared with each other. When the boundary shape 145 after the heating, which is provided in the vicinity of the end portion 91 of the joining member, is straighter than the boundary shape 144 before the heating, it is possible to confirm the fact that the glass base member has been elastically deformed in the state before the joining member 1 is softened (FIG. 2D).

Further, the thickness of the joining member 1, which is provided at the maximum thickness portion 92 of the end portion 91 of the joining member, is designated as "d" in relation to the boundary shape 144 of the glass base member before the heating. The positions, at which the distance in the widthwise direction of the joining member 1 is d from the maximum thickness portion 92 on the surface of the glass base member 14, are designated as "positions 141, 142". A virtual boundary line, which is obtained by connecting the positions 141, 142 with a straight line, is designated as "boundary line 143". In this arrangement, when the boundary shape 144 of the glass base member before the heating is disposed on the internal side of the glass base member of the glass base member 14 as compared with the virtual boundary line 143, it is possible to confirm the fact that the glass base member is deformed while being depressed toward the internal side of the glass base member.

In the airtight envelope of the present invention, the compressive stress remains stably in the end portion 91 of the joining member irrelevant to the pressure fluctuation caused at the outside of the airtight envelope. Therefore, it has been successfully confirmed that the crack hardly arises in the joining member in the pressure-reduced environment even when the airtight envelope is placed in a pressure-reduced chamber at 0.1 atmosphere (10 kPa). Further, even when any crack appears in the joining member, it has been successfully confirmed that the crack hardly develops to the end portion 91 of the joining member.

The stress distribution in the widthwise direction of the joining member of the airtight envelope of the present invention can be confirmed by cutting out a sample or specimen including the joining member as shown in FIG. 2C and measuring the sample by using an optical elastic stress measuring apparatus (for example, GFP 1400 produced by Stress Photonics).

Next, an explanation will be made in detail with reference to FIGS. 3 and 4 about the method for producing the airtight envelope of the present invention.

Figure 3:
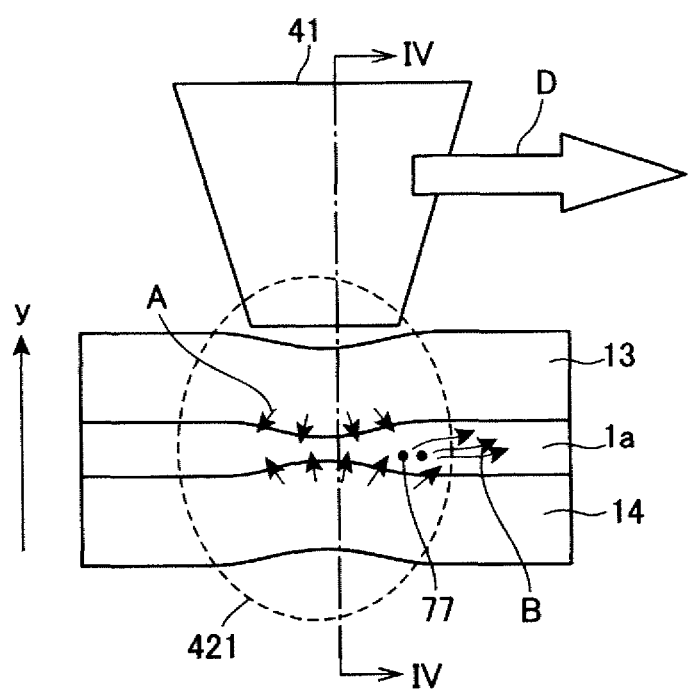
FIG. 3 shows the way of deformation of glass base members during the laser radiation.

As shown in FIG. 3, the method for producing the glass structural unit of the present invention comprises a step of applying the pressurizing force in the thickness direction of the joining material (direction perpendicular to the glass base members and the joining material) sustainably or continuously to a temporary assembly in which the joining material 1a is interposed between the pair of glass base members 13, 14. The method for producing the glass structural unit further comprises a step of radiating a first local heating light beam 41 onto the temporary assembly.

The radiating step includes a step of moving the temporary assembly or a light source of the first local heating light beam 41 in the direction in which the joining material 1a extends. The direction, in which the joining material 1a extends, is the direction which is perpendicular to the widthwise direction of the joining material 1a and which is parallel to the glass base members 13, 14 as shown in FIG. 2. Further, the direction, in which the joining material 1a extends, is the direction which is indicated by the arrow D as shown in FIG. 3.

In the method for producing the glass structural unit, the glass base members 13, 14 are elastically deformed selectively (locally) in a radiation area 421 during the radiation of the first local heating light beam 41. Accordingly, the method has such a feature that the pressurizing force, which is exerted on the joining material 1a, is increased in the radiation area 421.

The increase in the pressurizing force is caused by the temperature difference (temperature distribution) in the thickness direction of the glass base member (indicated by the arrow y shown in FIG. 3) of each of the first glass base member 13 positioned on the side on which the first local heating light beam 41 is allowed to come thereinto and the second glass base member 14 positioned on the side which is opposed thereto. The temperature difference in the thickness direction of the glass base member is generated as follows. The joining material 1a absorbs the energy of the first local heating light beam 41, and thus the temperature of the joining material 1a is locally raised. The joining material 1a is softened and melted to provide the fluidity in the temperature-raised area 421. The softened and melted joining material 1a is brought in contact with the glass base members 13, 14 appropriately in view of the heat transfer. Accordingly, the glass base members 13, 14 are brought in contact with the joining material 1a which has the high temperature and which has the fluidity, and the glass base members 13, 14 are rapidly heated.

It is noted that the glass base members 13, 14 themselves have the low energy absorption performance with respect to the wavelength of the first local heating light beam 41. Accordingly, the temperature distribution in the thickness direction of the glass base member is formed in the glass base members 13, 14 such that the temperature is more raised at positions nearer to the joining material 1a in the thickness direction and the temperature is more lowered at positions separated farther from the joining material 1a in the thickness direction (at positions disposed on the more internal side of the glass base member).

The mode of thermal expansion of each of the glass base members 13, 14 differs in the thickness direction on account of the temperature difference in the thickness direction of each of the glass base members 13, 14 as described above. Therefore, as shown in FIG. 3, the glass base members 13, 14 are warped such that the portions, which are disposed nearer to the joining material 1a, are allowed to protrude. As a result of the warpage of the glass base members 13, 14, the glass base members 13, 14 selectively (locally) press the softened and melted joining material 1a in the radiation area 421 of the first local heating light beam 41. Therefore, the pressurizing force, which is exerted on the joining material 1a, is increased in the radiation area 421.

The phenomenon, in which the difference arises in the thickness direction in relation to the mode of the thermal expansion on account of the temperature distribution in the glass base member and the glass base member is warped, resembles the phenomenon in which the difference arises in the thickness direction in relation to the mode of the thermal expansion on account of the difference in the coefficient of thermal expansion in the thickness direction and the bimetal is warped. The phenomenon, in which the glass base member is warped on account of the temperature distribution in the thickness direction in the method for producing the glass structural unit of the present invention, is hereinafter referred to as "bimetal effect".

The joining material is melted after the radiation of the first local heating light beam 41, and the temperature difference is increased in the thickness direction of the glass base member. The temperature difference in the thickness direction of the glass base member is gradually relieved in accordance with the action of thermal diffusion after the point in time at which the temperature difference in the thickness direction of the glass base member is maximized. When the radiation condition of the first local heating light beam 41 is appropriately set, then it is possible to regulate the relieving speed of the temperature difference in the thickness direction of the glass base member generated after the radiation of the first local heating light beam 41, and it is possible to regulate the action for increasing the pressurizing force exerted on the joining material.

An explanation will be made in detail with reference to FIG. 4 about elemental processes of the elastic deformation of the glass base member brought about by the bimetal effect described above, the elastic deformation in which the boundary surface between the joining member and the glass base member is depressed toward the internal side of the glass base member at the end portion of the joining member, and the elastic deformation in which the surface of the glass base member is depressed toward the internal side of the glass base member in the vicinity of the end portion of the joining member. The respective drawings in FIG. 4 are sectional views illustrating the glass base members 13, 14 and the joining material 1a taken along a line IV-IV shown in FIG. 3. The symbol D shown in FIG. 4 indicates the direction of movement of the radiation position brought about by the first local heating light beam 41.

Figure 4A:
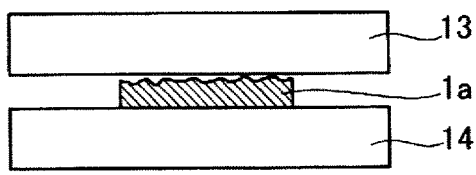
FIGS. 4A, 4B, 4C, 4D, 4E, 4F, 4G and 4H show the change of state of a joining material and glass base members brought about by the laser radiation.

FIG. 4A shows an assembly stage in which the joining material 1a is arranged so that the joining material 1a is interposed between the pair of glass base members 13, 14. In this stage, the pressure is applied to the joining material 1a by the aid of the pair of glass base members.

Figure 4E:
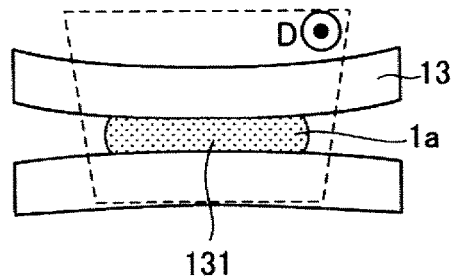
Figure 4B:
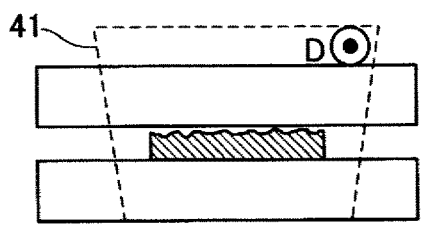

FIG. 4B shows a stage wherein the first local heating light beam 41, which has a sufficient beam diameter to heat the joining material 1a entirely in the widthwise direction, is radiated onto the joining material 1a via the glass base member 13 (first glass base member).

Figure 4F:
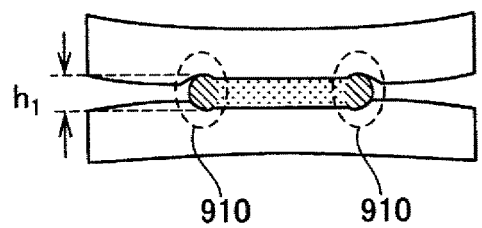
Figure 4C:
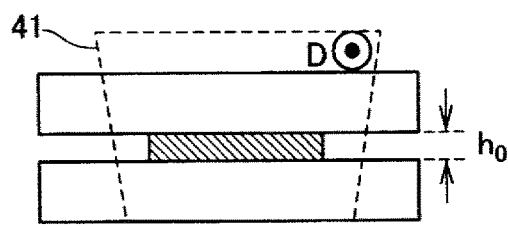

FIG. 4C shows a state in which the joining material 1a is softened and deformed in accordance with the increase in the temperature. The joining material 1a according to the present invention is capable of providing the viscosity (coefficient of viscosity) which has the negative temperature coefficient. That is, the viscosity of the joining material 1a is changed at a negative gradient with respect to the temperature change when the material is softened or melted. The joining material 1a is the material which absorbs the energy in relation to the wavelength of the first local heating light beam 41. That is, the wavelength of the first local heating light beam 41 is included in the absorption band of the joining material 1a. Further, the first local heating light beam 41 is transmitted through the glass base members 13, 14. When the temperature of the joining material 1a is raised by being irradiated with the first local heating light beam 41, the joining material 1a is softened and deformed in accordance with the pressing brought about in the assembly stage. The joining material 1a has no fluidity in this stage. However, minute protrusions and recesses of the joining material 1a are crushed by the pressurization, and the tight contact performance with respect to the glass base members is enhanced as compared with the stage shown in FIG. 4B.

Figure 4G:
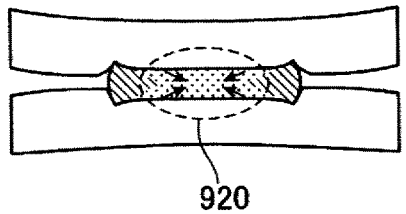
Figure 4D:
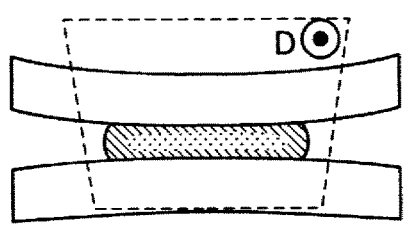

FIG. 4D shows a state in which the temperature of the joining material 1a is further raised as compared with the stage shown in FIG. 4C, and the joining material 1a having the high temperature is further brought in tight contact with the glass base members. In this stage, the heat transfer is facilitated from the high temperature joining material 1a to the glass base members, and the temperature difference is enlarged between the side of the glass base member which is disposed nearer to the surface brought in contact with the joining material 1a and the side which is disposed nearer to the surface on the opposite side with respect to the contact surface. The pressurizing force, with which the glass base members press the joining material 1a, is more strengthened in accordance with the bimetal effect in the thickness direction of the glass base members described above.

FIG. 4E shows a stage in which the radiation of the first local heating light beam 41 is completed for the interested portion of the joining material 1a. In this stage, the joining material 1a is softened and melted. The joining material 1a is pressed more strongly by the glass base members deformed and warped toward the side of the joining material 1a. In this stage, the temperatures of the joining material 1a and the glass base members are the maximum arrival temperatures.

FIG. 4F shows a stage in which the cooling solidification of the joining material 1a is started after the first local heating light beam 41 is allowed to pass. In this stage, the joining material 1a begins to solidify from the end portions 910 in the widthwise direction in accordance with the thermal diffusion to the low temperature areas including the surrounding non-heated areas. In this situation, the bimetal effect of the glass base members begins to decrease, and the warpage of the glass base members begins to reduce. However, the glass base members are still greatly warped at the stage at which the end portions 910 of the joining material 1a begin to solidify. Therefore, the thickness $h_1$ of the end portion 910 of the solidified joining material 1a is higher than the thickness $h_0$ of the joining material 1a at the stage of FIG. 4C which resides in such a state that the glass base members are hardly warped (in such a state that the pair of glass base members are substantially parallel to one another).

FIG. 4G shows a stage in which the cooling of joining material 1a and the glass base members is further advanced as compared with the stage of FIG. 4F, and the solidification is advanced from the end portion areas 910 of the joining material 1a to the central portion 920 in the widthwise direction of the joining material 1a. The maximum arrival temperature of the joining material 1a is higher when the maximum arrival temperature of the joining material 1a in the stage of FIG. 4E and the maximum arrival temperatures of the glass base members are compared with each other.

Therefore, the amount of shrinkage of the joining material 1a is relatively large when the amount of shrinkage of the joining material 1a and the amounts of shrinkage of the glass base members brought about by the cooling are compared with each other. Further, the glass base members are warped in accordance with the bimetal effect in the stages of FIGS. 4D to 4F. However, the warpage resides in the elastic deformation. As the cooling is advanced, the glass base members intend to be restored to the state of FIG. 4C in which the pair of glass base members has been substantially in parallel to one another. Accordingly, in the stage in which the central portion 920 of the joining material 1a is solidified, the thickness of the joining material 1a approaches the thickness $h_0$ of the joining material 1a provided in the stage of FIG. 4C.

Figure 4H:
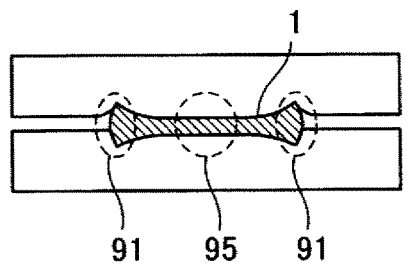

FIG. 4H shows a state in which the joining material 1a is solidified, and the glass base members are joined to one another by the joining member 1. The end portions 910 of the joining material 1a are firstly solidified in the state in which the pair of glass base members is warped, and the central portion 920 of the joining material 1a is solidified later in the state in which the pair of glass base members are restored from the warpage. Accordingly, as shown in FIG. 4H, the joining member 1, which is formed between the glass base members, has such a shape that the end portions 91 of the joining member having the high film thicknesses are embraced in the glass base members. In this stage, the end portions 91 of the joining member, which are formed by being solidified earlier, are thicker than the central area 95 in the widthwise direction of the joining member 1, and the end portions 91 form the joining surfaces (boundary surfaces) in such a mode that the end portions 91 bite into the glass base members.

The glass base members are elastically deformed by being depressed or forcibly recessed in the internal directions of the glass base members by the end portions 91 of the joining member in the vicinity of the end portions 91 of the joining member. The state, in which the glass base members are elastically deformed in the internal directions of the glass base members at the end portions in the widthwise direction of the joining member 1, is maintained in the pair of glass base members joined by the joining member 1. Therefore, the compressive stress areas are stably formed at the end portions in the widthwise direction of the joining member 1 in the pair of glass base members joined by the joining member 1.

The bimetal effect, which is generated in those stages shown in FIGS. 4D to 4F, is generated over the entire circumference about the center of the heating area brought about by the first local heating light beam 41 in the plane of the glass base member 13 including those disposed in the depth direction without being limited to only those disposed the left-right direction on the paper surface of the drawing. In this case, the illustration is partially omitted in FIGS. 4D to 4F for the purpose of simplification.

Next, an explanation will be made about the requirement to be fulfilled by the method for producing the glass structural unit of the present invention.

In the method for producing the glass structural unit according to the present invention, it is necessary that the bimetal effect, which is in the sense as described above, should be generated in the glass base members at the portions disposed in the vicinity of the irradiation position of the first local heating light beam. Further, it is necessary that the end portions in the widthwise direction of the joining material should be melted and joined in the state in which the glass base members are warped in accordance with the bimetal effect. For this purpose, it is appropriate to join the end portions in the widthwise direction of the joining material in the stage before the heat, which is transferred from the heated and melted joining material having the high temperature to the inside of the glass base members, is diffused in the glass base members to consequently uniformize the temperature distributions in the glass base members. When this requirement is fulfilled in at least one of the pair of glass base members, it is possible to obtain the effect of the present invention such that the compressive stress areas are formed at the end portions in the widthwise direction of the joining member. In view of the above, the following discussion will be made about the first glass base member (rear plate 13) arranged on the incident side of the first local heating light beam.

The heat transfer is caused in the glass base member 13 from the joining material 1a having the high temperature in the stages of FIGS. 4D to 4F. In this case, it is appropriate to consider the non-steady heat conduction in which the temperature distribution generated in the thickness direction of the glass base member 13 is dealt with in the state (FIG. 4E) in which the joining material 1a is brought in contact with the surface 131 of the glass base member 13 and the rapid heating is performed for the surface 131 of the glass base member 13.

When the joining material 1a having the high temperature is brought in contact with the surface 131 of the glass base member 13 for an extremely short period of time t (s) to heat the glass base member 13, the range (temperature permeation depth) δ (m), in which the temperature is diffused into the interior of the glass base member 13, is expressed as follows provided that the thermal diffusivity of the glass base member 13 is represented by a (m²/s):

$$\delta = (12at)^{0.5}$$

In the present invention, the heating time t (s) is appropriately regarded as the time of passage of the first local heating light beam. Assuming that the velocity of movement of the radiation position brought about by the first local heating light beam is v (m/s) and the beam diameter in the direction of movement of the first local heating light beam is ϕ (m), the heating time t (s) is expressed as follows:

$$t=\phi/v$$

The condition, under which the bimetal effect is generated as described above in the glass base member, is expressed, assuming that the thickness of the glass base member is d (m), as follows: d>>δ. According to the experiments and the investigations performed by the present inventors, the condition, under which the sufficient compressive stress is generated in the vicinity of the end portion 91 (see FIG. 4H) in the widthwise direction of the joining member to be finally formed, is expressed as follows:

$$d>8\times\delta$$

When this expression is replaced with δ and t described above, and the expression is deformed, then the following expression is obtained:

$$\phi/v<(d/8)^2/(12a) \quad \text{(Expression 1)}$$

When the thickness d of the first glass base member disposed on the side on which the first local heating light beam is allowed to come and the thermal diffusivity a of the first glass base member are given, it is appropriate that the velocity of movement v and the beam diameter ϕ in the direction of movement, which fulfill Expression 1 described above, are selected as the radiation condition of the first local heating light beam. Accordingly, the bimetal effect as described above is generated at the radiation position of the first local heating light beam in the glass base member. Further, the area of the sufficient compressive stress is formed at the end portion 91 in the widthwise direction of the joining member to be finally formed.

The thickness d of the glass base member described above can represent the thickness of the glass base member disposed on the incident side as viewed from the joining material preferentially heated by the first local heating light beam. Therefore, when the glass base members disposed on the incident side, which are in the local heating stage, can be grasped as an integrated structure of the two or more glass base members joined before the heating step, the total of the thicknesses of the glass base members capable of being dealt with in the integrated manner is regarded as the thickness d of the glass base members.

In this case, in order to heat the joining material 1*a* in the entire region in the widthwise direction thereof, it is necessary that the beam diameter ϕ in the direction of movement of the first local heating light beam should fulfill the following expression provided that the width of the joining material 1*a* is w:

$$\phi>w \quad \text{(Expression 2)}$$

If the thermal diffusivity a of the glass base member is not clarified directly, the thermal diffusivity a is determined in accordance with Expression 3 described below:

$$a=\lambda/Cp/\rho \quad \text{(Expression 3)}$$

In Expression 3, λ represents the thermal conductivity of the glass base member, Cp represents the specific heat capacity of the glass base member, and ρ represents the density of the glass base member.

The joining material, which is applicable to the joined unit of glass base members, the airtight envelope, and the method for producing the glass structural unit according to the present invention, is not specifically limited provided that the material has the softening point lower than the softening point of the glass base member and the viscosity (coefficient of viscosity) has the negative temperature coefficient. The phrase "viscosity has the negative temperature coefficient" means the fact that the viscosity is decreased when the temperature is raised, i.e., the fact that the temperature dependency of the viscosity is negative. These conditions are required in order that the glass base members are elastically deformed in the stage in which the joining material is softened, and the joining material is satisfactorily brought in contact with the pair of glass base members in the stage in which the joining material interposed between the pair of glass base members is melted (see FIGS. 4D to 4E). The joining material, which is applicable to the present invention, can be exemplified, for example, by the glass frit, and the low melting point metal. In particular, the glass frit of the non-crystalline type is more preferred, because it hardly suffers from the influence of the atmosphere and the temperature.

The glass base member, which is applicable to the joined unit of glass base members, the airtight envelope, and the method for producing the glass structural unit of the present invention, is not specifically limited provided that the glass base member fulfills the foregoing condition that the softening point is higher than the softening point of the joining material. It is preferable to adopt non-alkali glass or alkali-free glass and high strain point glass generally applicable to the display glass, in view of the stability of the dimensional tolerance and the chemical stability against the thermal influence during the production.

The first local heating light beam, which is applicable to the method for producing the glass structural unit and the method for producing the airtight envelope of the present invention, is not specifically limited provided that the light beam has such a wavelength characteristic that the light beam is transmissive through the glass base member and the light beam is absorbable by the joining material. For example, an infrared lamp or the like, which is combined with a convergent optical system, is usable as the first local heating light beam of the present invention. Further, it is preferable to use the semiconductor laser and the gas laser such as the $CO_2$ laser or the like, in view of the fact that the moving radiation is conveniently performed and in view of the fact that the radiation spot is sharp.

The radiation condition of the first local heating light beam, which is applicable to the method for producing the glass structural unit and the method for producing the airtight envelope of the present invention, appropriately fulfills Expressions 1 and 2 described above. In order to localize the area in which the load is concentrated in accordance with the bimetal effect of the glass base members during the radiation and the heating, it is preferable to perform the radiation while the beam diameter ϕ of the first local heating light beam is decreased within a range in which the beam diameter ϕ is not less than the width w of the joining material and the velocity of movement v is made higher.

Next, an explanation will be made with reference to the drawings about an embodiment of the method for joining the glass base members in the method for producing the glass structural unit of the present invention. In this embodiment, the glass base members are joined by radiating a second local heating light beam onto the joining material 1*a* in addition to the first local heating light beam which fulfills the radiation conditions of Expressions 1 and 2 described above.

Figure 8A:
FIGS. 8A, 8B, 8C, 8D, 8E, 8F, 8G, 8H, 8I, 8J and 8K show a method for producing an airtight envelope concerning Examples 1, 3, 4, 6, 7, 8, and 9.
Figure 8B:
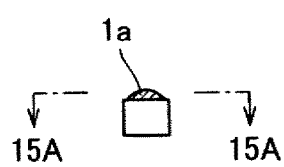
Figure 8C:
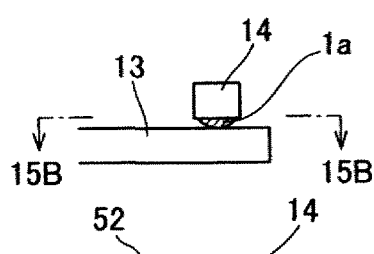

In the embodiment explained herein, the first local heating light beam is radiated, and then the second local heating light beam is radiated to follow the first local heating light beam.
(Step 1)
At first, as shown in FIG. 8A, a frame member 14 (first glass base member) is prepared. Subsequently, as shown in FIG. 8B, a joining material 1a is arranged on the frame member 14, and the joining material 1a is formed so that the joining material 1a has a frame-shaped form which is the same as or equivalent to that of the frame member 14 as a whole. The joining material 1a is arranged so that the joining material 1a extends at a predetermined width W along the opposing surfaces of the frame member 14 and a rear plate 13. It is desirable that the joining material 1a provides a viscosity which has a negative temperature coefficient when the material is soften or melted, the joining material 1a is softened at a high temperature, and the joining material 1a has a softening point which is lower than that of any one of a face plate 12, the rear plate 13, and the frame member 14. Examples of the joining material 1a include glass frit, inorganic adhesive, and organic adhesive. It is preferable that the joining material 1a exhibits the high absorption performance with respect to the wavelength of the local heating light beam as described later on. When an airtight envelope, which is used, for example, for FED having the internal space required to maintain the degree of vacuum, is produced, the glass frit or the inorganic adhesive, which is capable of suppressing the decomposition of any residual hydrocarbon, is preferably used.
(Step 2)
Subsequently, as shown in FIG. 8C, the components are arranged so that the rear plate 13 (second glass base member) formed with, for example, electron emission elements 27 or the like and the frame member 14 are opposed to one another with the joining material 1a intervening therebetween. Accordingly, the joining material 1a is arranged between the frame member 14 (first glass base member) and the rear plate 13 (second glass base member) so that the joining material 1a is brought in contact with both of the frame member 14 and the rear plate 13.

Figure 8D:
Figure 8E:
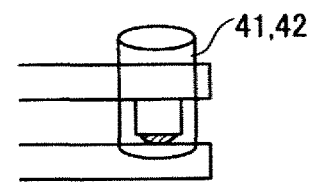

As shown in FIG. 8D, in order to reliably allow the joining material 1a and the rear plate 13 to be in contact with each other and uniformize the pressing force exerted on the joining material 1a, the frame member 14 is covered with a glass base member 52 (third glass base member) on the side opposite to the surface on which the joining material 1a is arranged. It is preferable to apply an auxiliary load in the thickness direction of the joining material 1a so that the joining material 1a is pressed against the rear plate 13.
(Step 3: First and Second Joining Steps)
Subsequently, as shown in FIG. 8E, the first and second local heating light beams 41, 42 are radiated onto the joining material 1a while moving the first and second local heating light beams 41, 42, and the rear plate 13 and the frame member 14, which are arranged oppositely, are joined to one another. The first and second local heating light beams 41, 42 are radiated onto the joining material 1a while being moved in the direction D (see FIG. 5A) in which the joining material 1a extends. In this procedure, the second local heating light beam 42 is moved while following the first local heating light beam 41. It is appropriate that the first and second local heating light beams 41, 42 are capable of locally heating the vicinity of the joined area. The semiconductor laser is preferably used as the light source. A processing semiconductor laser, which has a wavelength in the infrared region, is preferred as the light sources of the local heating light beams 41, 42 in view of, for example, the performance to locally heat the joining material 1a and the transmission performance through the glass base member.

Figure 5A:
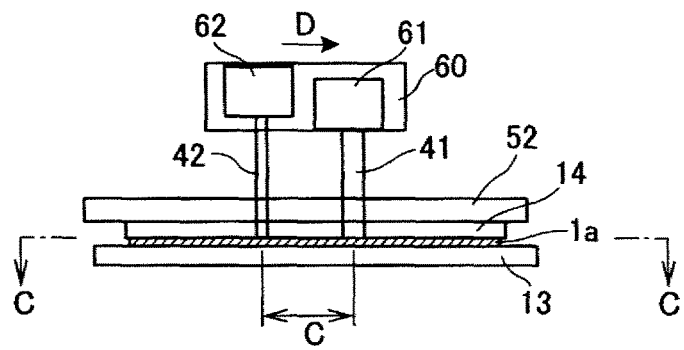
FIGS. 5A, 5B, 5C and 5D show a method for radiating the local heating light beams in Examples 1 and 2.

With reference to FIG. 5A, a first laser head 61 for emitting the first local heating light beam 41 and a second laser head 62 for emitting the second local heating light beam 42 are fixed to a breadboard 60 so that the distance between optical axes is a predetermined spacing distance C in the direction D in which the joining material 1a extends. Accordingly, the second local heating light beam 42 is moved while following the first local heating light beam 41, at the same velocity as that of the first local heating light beam 41. The radiation position, which is brought about by the second local heating light beam 42, may be moved at the same velocity as that of the radiation position which is brought about by the first local heating light beam 41, while following the radiation position which is brought about by the first local heating light beam 41 by moving the radiation objective including the joining material 1a. Alternatively, the radiation position, which is brought about by the second local heating light beam 42, may be moved at the same velocity as that of the radiation position which is brought about by the first local heating light beam 41, while following the radiation position which is brought about by the first local heating light beam 41 by moving the breadboard 60 in the direction D.

In this specification, the process of heating and melting the joining material 1a by the radiation of the first local heating light beam 41 and cooling the joining material 1a thereafter is referred to as the first joining step. Further, the process of heating and melting the joining material 1a by the radiation of the second local heating light beam 42 and cooling the joining material 1a thereafter is referred to as the second joining step. In this embodiment, the radiation of the local heating light beam is performed twice approximately simultaneously with a slight difference in time by using the first laser head 61 and the second laser head 62 fixed to the breadboard 60. The first joining step and the second joining step may be performed at mutually distinct timings.

Figure 5B:
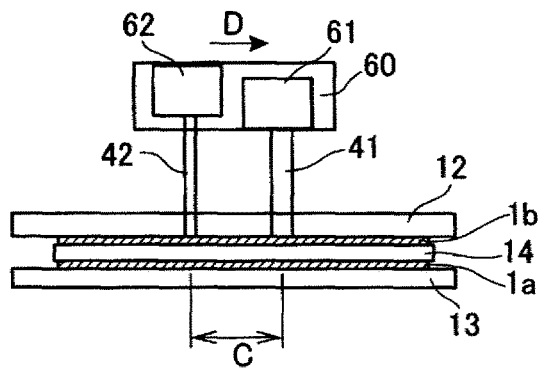
Figure 5C:
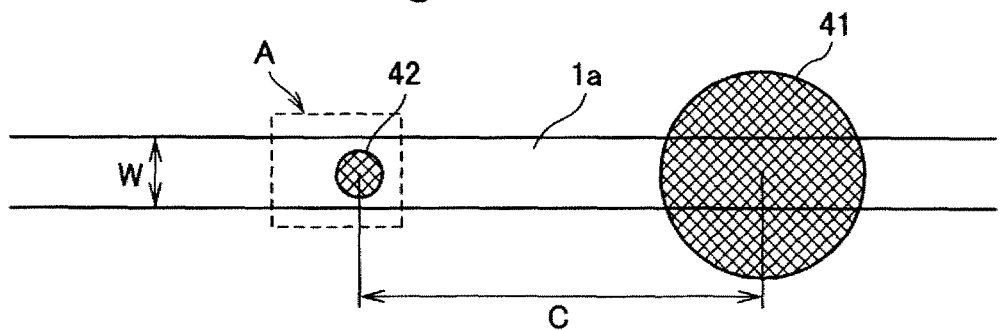

The joining material 1a is successively heated and melted in the direction D in which the joining material 1a extends, by being irradiated with the first local heating light beam 41. After that, the joining material 1a is cooled to a temperature of not more than the softening point. The first local heating light beam 41 is radiated while being moved in the direction in which the joining material 1a arranged on the frame member 14 extends. The joining material 1a is formed to provide a frame-shaped form as a whole on the frame member 14. As shown in FIGS. 5A and 5C, the beam spot of the first local heating light beam 41 is set to be large to some extent, and the joining material 1a is heated and melted in the entire region in the widthwise direction of the joining material 1a. FIG. 5C shows a plan view as viewed from a line CC shown in FIG. 5A.

The second local heating light beam 42 is radiated after the joining material 1a, which has been melted by the radiation of the first local heating light beam 41, is cooled to a temperature of not more than the softening point. The second local heating light beam 42 is radiated while following the first local heating light beam 41 while maintaining the spacing distance C between the optical axes with respect to the first local heating light beam 41. Accordingly, a part of the joining material 1a in the widthwise direction, which has been cooled to the temperature of not more than the softening point, is heated and melted again.

Figure 5D:
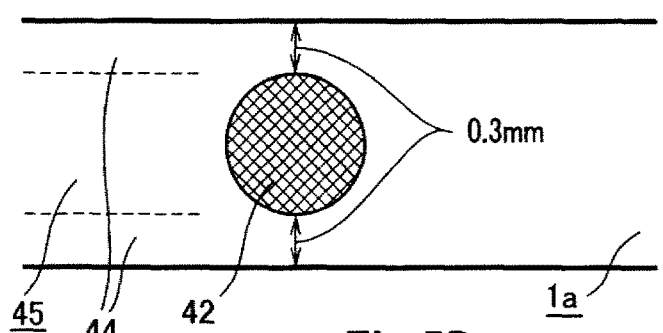
Figure 6A:
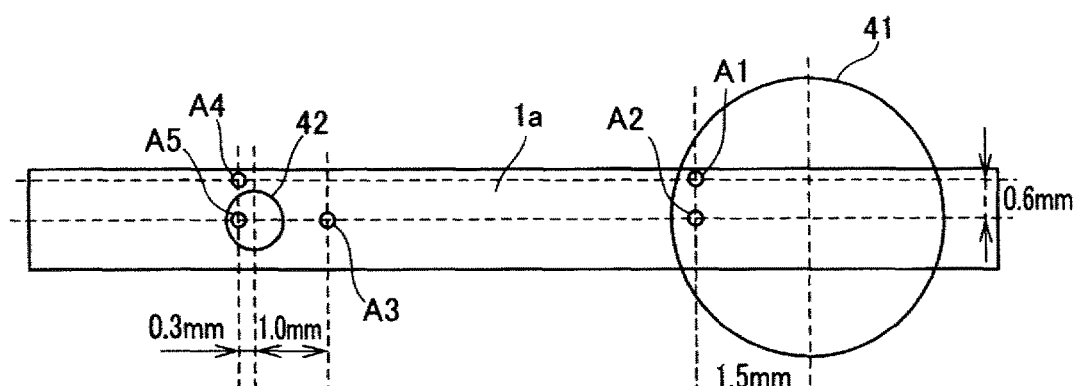
FIGS. 6A and 6B show a method for observing the temperature of a joining material in Examples 1 and 2.
Figure 6B:
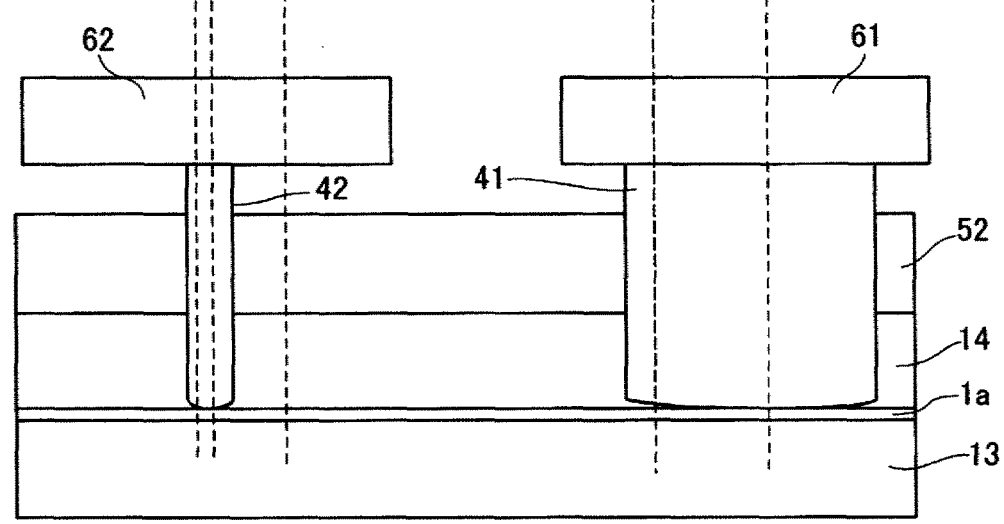

The second local heating light beam 42 is radiated to provide such a state that the surrounding of a part of the joining material 1a heated and melted again is surrounded by a part of the joining material 1a having a temperature of not more than the softening point. Specifically, as shown in FIG. 5D, the beam diameter of the second local heating light beam 42 is smaller than the width W of the joining material 1a. Accordingly, the second local heating light beam 42 is radiated so that only the central portion 45, which is interposed between the both side portions 44 in the widthwise direction of the joining material 1a, is heated and melted again, while the both side portions 44 are not softened. In this description, FIG. 5D shows an enlarged view of a portion A surrounded by broken lines shown in FIG. 5C. Accordingly, the part of the joining material 1a in the widthwise direction is heated and melted again. Further, the side portions 44, in which at least parts thereof are not melted, are secured on the both sides of the portion heated and melted again respectively in the widthwise direction of the joining material 1a. The central portion 45, which is heated and melted again, is thereafter cooled to a temperature of not more than the softening point.

It is necessary to fulfill the following requirement in order that the surrounding of the portion heated and melted again by being irradiated with the second local heating light beam 42 is surrounded by the joining material 1a having the temperature of not more than the softening point. That is, it is necessary that the joining material 1a, which has been heated and melted in the entire region in the widthwise direction by being irradiated with the first local heating light beam 41, should be cooled to the temperature of not more than the softening point until the second local heating light beam 42 is radiated. This requirement can be satisfied by adjusting the distance C between the optical axes of the first local heating light beam 41 and the second local heating light beam 42 and the cooling speed of the joining material 1a. In order to secure the side portions 44 which are not melted again on the both sides of the portion which is heated and melted again, it is appropriate that a desired range is heated and melted again by adjusting the radiation condition of the second local heating light beam 42 including, for example, the beam diameter.

When the second local heating light beam 42 is radiated, the joining material 1a is appropriately in such a state that the joining material 1a is cooled to the temperature of not more than the softening point after the joining material 1a is heated and melted in the entire region in the widthwise direction of the joining material 1a.

The first and second local heating light beams 41, 42 may be radiated from the same side or the first and second local heating light beams 41, 42 may be radiated from the mutually opposite sides with respect to the joining objective provided that the joining material 1a can be irradiated therewith and heated in the predetermined areas respectively (the entire region in the widthwise direction for the first local heating light beam 41 and the central portion in the widthwise direction for the second local heating light beam 42). For example, when the joining material 1a, which is disposed between the frame member 14 and the rear plate 13, is subjected to the radiation, then both of the first and second local heating light beams 41, 42 may be allowed to come from the side of the frame member 14 as shown in FIG. 5, or one of the first and second local heating light beams 41, 42 may be allowed to come from the side of the frame member 14 and the other may be allowed to come from the side of the rear plate 13.

FIG. 7 illustrates the stress distribution of the joining member 1 for joining the frame member 14 and the rear plate 13. FIGS. 7B to 7D show sectional views each illustrating the frame member 14, the joining member 1, and the rear plate 13 taken along a virtual plane S perpendicular to the direction in which the joining material 1a extends as shown in FIG. 7A.

Figure 7A:
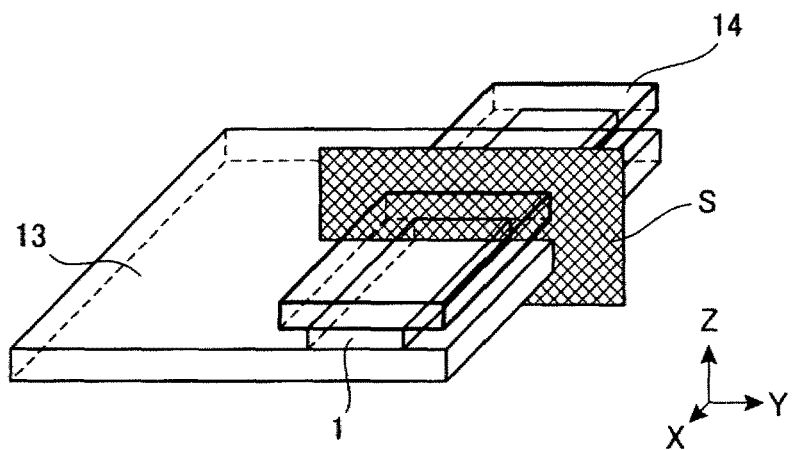
FIGS. 7A. 7B, 7C and 7D show the stress distribution in a joining member.
Figure 7B:
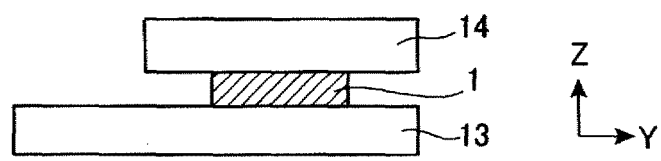

FIG. 7B shows a distribution of the residual stress in the joining member 1 as obtained such that the first local heating light beam 41, which satisfies Expressions 1 and 2 described above, are not radiated, the joining material 1a is heated and melted by means of only the whole heating based on the use of a heating furnace, and then the joining material 1a is cooled to a temperature of not more than the softening point.

Figure 7C:
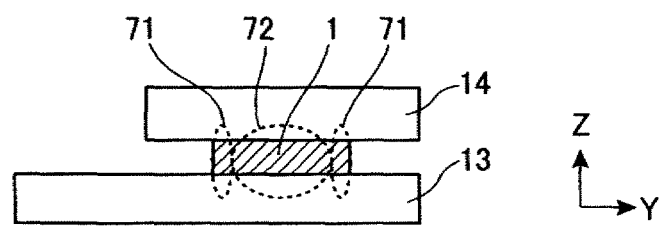

FIG. 7C shows a distribution of the residual stress in the joining member 1 as obtained such that the joining material 1a is heated and melted by using only the first local heating light beam 41 shown in FIG. 5C, and then the joining material 1a is cooled to a temperature of not more than the softening point.

Figure 7D:
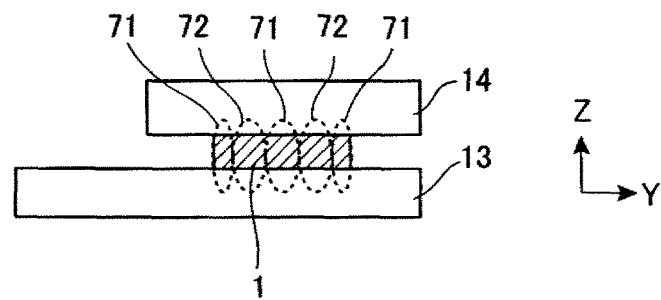

FIG. 7D shows a distribution of the residual stress in the joining member 1 as obtained such that the first local heating light beam 41 and the second local heating light beam 42 shown in FIG. 5C are radiated under the radiation condition described above.

The stress distribution indicates a distribution of the tensile stress and the compressive stress in the Z direction (thickness direction) corresponding to the shearing stress in the plane inclined by 45° with respect to the Y and Z directions provided that X represents the direction in which the joining material 1a extends, Y represents the widthwise direction of the joining material 1a, and Z represents the thickness direction of the joining material a.

When the glass base members were joined by heating the joining material 1a as a whole by using a heating furnace as shown in FIG. 7B, it was difficult to generate any area of the compressive stress in order to prohibit the development of the crack in the joining member 1.

When the glass base members were joined by radiating only the first local heating light beam 41 as shown in FIG. 7C, the compressive stress areas 71 were formed at the end portions in the widthwise direction of the joining member 1. The central portion in the widthwise direction of the joining member 1, which was adjacent to the compressive stress areas 71 disposed at the end portions in the widthwise direction of the joining member 1, was the tensile stress area 72. Therefore, the appearance of the crack is suppressed, which would be otherwise caused at the end portions in the widthwise direction of the joining member 1 by any external force allowed to act from the outside of the airtight envelope. Therefore, the decrease in the airtightness is suppressed. When any crack appears at the central portion in the widthwise direction of the joining member 1, the crack develops in the widthwise direction Y of the joining member 1 so that the crack travels transversely across the tensile stress area 72. However, the development of the crack is prohibited in the compressive stress areas 71. Therefore, the decrease in the airtightness is suppressed as well.

In this embodiment shown in FIG. 7D, the second local heating light beam 42 is radiated onto the joining material 1a which has been heated and melted by the first local heating light beam 41 and which has been thereafter cooled to the temperature of not more than the softening point. Accordingly, the joining material 1a is locally melted again, and the surrounding of the portion which has been melted again is surrounded by the joining material having the temperature of not more than the softening point. The portion, which is irradiated with the second local heating light beam 42, is compressed. As a result, as shown in FIG. 4D, the compressive stress areas 71, in which the residual stress in the thickness direction of the joining member 1 is the compressive stress, are formed at the central portion in the widthwise direction and the end portions in the widthwise direction of the joining member 1. The tensile stress areas 72, in which the residual stress in the thickness direction of the joining member 1 is the tensile stress, are formed adjacently to the compressive stress areas 71. The tensile stress areas 72, in which the crack tends to develop, are segmented by the compressive stress areas 71 in which the crack hardly develops. Therefore, the development of the crack is easily suppressed. In this way, the pair of glass base members is joined by radiating the first and second local heating light beams 41, 42 onto the joining material 1a. Thus, it is possible to obtain the more certain long-term airtightness reliability of the joining member.

(Step 4)

Figure 8F:
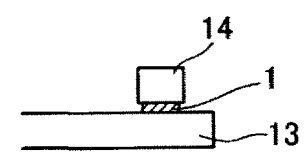
Figure 8G:
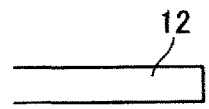
Figure 8H:
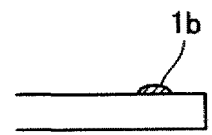
Figure 8I:
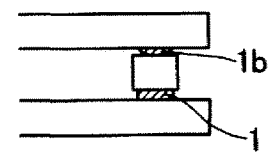
Figure 8J:
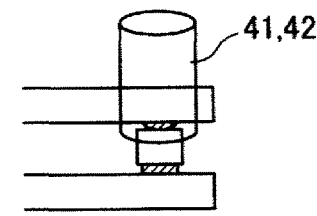
Figure 8K:
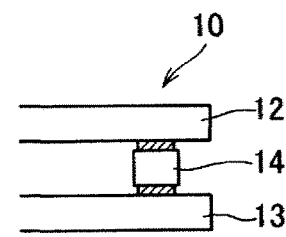

Subsequently, as shown in FIGS. 8G to 8K, the face plate 12 and the frame member 14 are joined to one another in accordance with the same procedures as those in Steps 1 to 3. Specifically, as shown in FIG. 8G, the face plate 12, on which fluorescent films 34 and other components are formed, is firstly prepared. Subsequently, as shown in FIG. 8H, a joining material 1b is formed in a frame-shaped form on the face plate 12 in the same manner as in Step 1. Subsequently, as shown in FIG. 8I, the face plate 12 and the frame member 14 are brought in contact with each other with the joining material 1b intervening therebetween in the same manner as in Step 2. In this procedure, the glass base member 52 is not used. Subsequently, as shown in FIGS. 8J and 5B, the first and second local heating light beams 41, 42 are radiated in the same manner as in Step 3. Accordingly, as shown in FIG. 8K, an envelope 10 is formed, in which the face plate 12 and the rear plate 13 are opposed to one another with the frame member 14 intervening therebetween, and the internal space is formed. In this embodiment, the joining material 1b is formed on the face plate 12. However, the joining material 1b may be formed on the frame member 14. It is preferable that the type and the physical property of the joining material 1b, the radiation condition of the laser beam and the like are the same as or equivalent to those in Steps 1 to 3.

In the embodiment explained above, the rear plate 13 and the frame member 14 are joined to one another, and the face plate 12 and the frame member 14 are further joined to one another. Accordingly, the envelope 10 is produced, in which the frame member 14 is inserted between the face plate 12 and the rear plate 13. More generally, the present invention provides the method for producing the airtight envelope at least a part of which is composed of the rear plate 13 and the face plate 12. The method for producing the airtight envelope of the present invention is applicable when a glass base member, in which a protruding portion having a shape of the frame member 14 is integrally formed beforehand, is used as one of the rear plate 13 and the face plate 12, and the glass base member is joined to the other plate. Further, the method for producing the airtight envelope of the present invention is applicable when the face plate 12 and the frame member 14 are previously joined to one another, and then the rear plate 13 and the frame member 14 are joined to one another.

The embodiment explained above is such an embodiment that the present invention is applied to the method for producing the airtight envelope to be used for the image display apparatus. More generally, the present invention is applicable when a first glass substrate and a second glass substrate are joined to one another. In this case, both of the first and second local heating light beams may be radiated from the side of the first glass substrate. Alternatively, one of the first and second local heating light beams may be radiated from the side of the first glass substrate, and the other may be radiated from the side of the second glass substrate. Further alternatively, both of the first and second local heating light beams may be radiated from the side of the second glass substrate.

Next, an explanation will be made with reference to the drawings about an embodiment of the method for joining the glass base members in the method for producing the glass structural unit of the present invention. In this embodiment, the glass base members are joined to one another by radiating a second local heating light beam onto a joining material 1a in addition to the first local heating light beam which fulfils the radiation conditions of Expressions 1 and 2 described above. In the embodiment explained herein, the second local heating light beam is radiated prior to the radiation of the first local heating light beam. The first and second local heating light beams are radiated so that the radiation position, which is brought about by the first local heating light beam, follows the radiation position which is brought about by the second local heating light beam.

In the following description, the "first glass base member" is used in the sense of the glass base member on which the joining material is formed, and the "second glass base member" is used in the sense of the glass base member which is arranged oppositely to the first glass base member with the joining material intervening therebetween. Therefore in Steps 1 to 3 described below, the frame member 14, which is the glass base member arranged with the joining material 1a, is the "first glass base member", and the rear plate 13, which is the glass base member arranged oppositely thereto, is the "second glass base member". On the other hand, in Step 4, the face plate 12, which is the glass base member arranged with the joining material, is the "first glass base member", and the frame member 14, which is the glass base member arranged oppositely thereto, is the "second glass base member".

(Step 1)

Figure 15A:
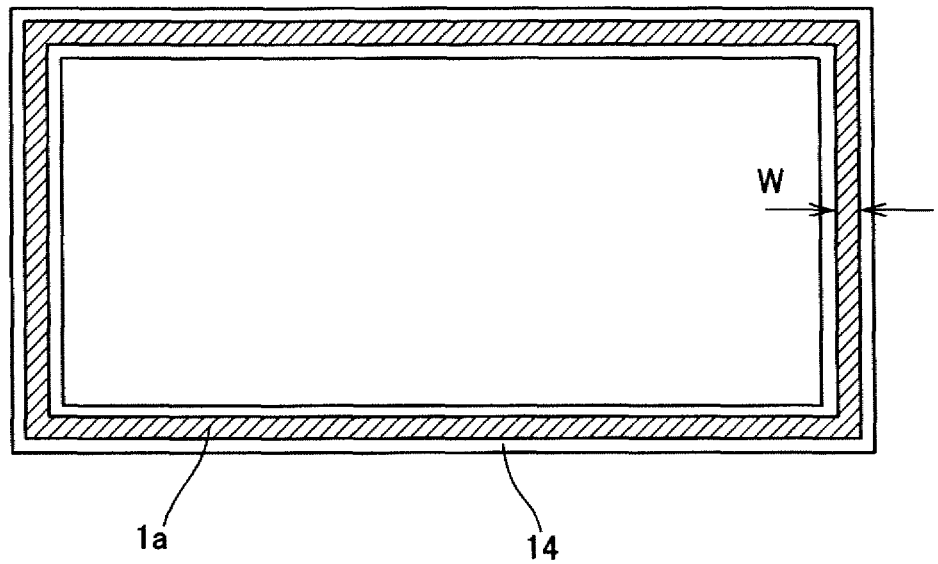
FIGS. 15A and 15B show a state in which a joining material is formed.

At first, as shown in FIG. 8A, a frame member 14 (first glass base member) is prepared. Subsequently, as shown in FIGS. 8B and 15A, a joining material 1a is arranged on the frame member 14, and the joining material 1a is formed so that the joining material 1a has a frame-shaped form which is the same as or equivalent to that of the frame member 14 as a whole. The joining material 1a is arranged so that the joining material 1a extends at a predetermined width W along the opposing surfaces of the frame member 14 and a rear plate 13. FIG. 15A shows a plan view as viewed from a line 15A-15A shown in FIG. 8B, illustrating a state in which the joining material 1a is formed on the frame member 14. It is desirable that the joining material 1a provides a viscosity which has a negative temperature coefficient, the joining material 1a is softened at a high temperature, and the joining material 1a has a softening point which is lower than that of any one of a face plate 12, the rear plate 13, and the frame member 14. Examples of the joining material 1a include, for example, glass frit, inorganic adhesive, and organic adhesive. It is preferable that the joining material 1a exhibits the high absorption performance with respect to the wavelength of the local heating light beam as described later on. When an airtight envelope, which is used, for example, for FED having the internal space required to maintain the degree of vacuum, is produced, the glass frit or the inorganic adhesive, which is capable of suppressing the decomposition of any residual hydrocarbon, is preferably used.

Figure 11A:
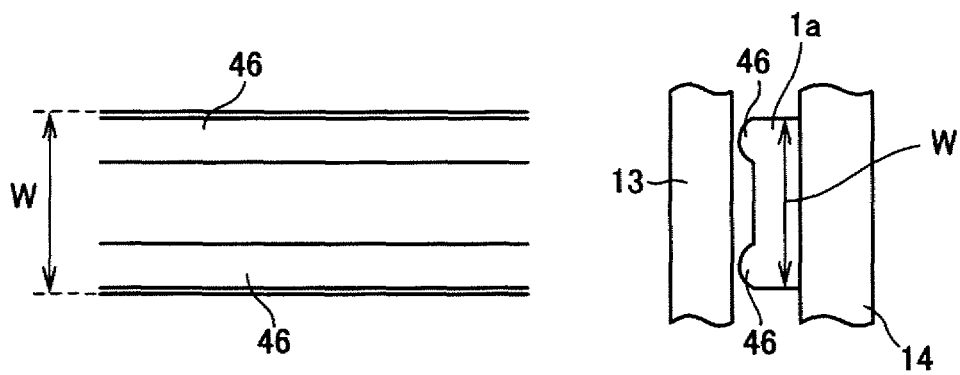
FIGS. 11A, 11B and 11C show a state of a joined area concerning Examples 3, 5, 6, 7, 8, and 9.

As shown in a right drawing of FIG. 11A (sectional view illustrating the frame member 14 and the joining material 1a), it is desirable that the joining material 1a is formed on the frame member 14 so that the both side portions 46 in the widthwise direction of the joining material 1a are allowed to protrude (see FIG. 15 as well). In another embodiment, as shown in a right drawing of FIG. 12A, it is also appropriate that the joining material 1a is formed on the frame member 14 so that the central portion 66 in the widthwise direction of the joining material 1a is allowed to protrude. FIG. 12 shows, in a similar way as FIG. 11, a state of the joined area as obtained when the protrusion is formed at the central portion in the widthwise direction of the joining material 1a. The protruding shapes of the joining material 1a as described above are provided in order that only a part or parts of the joining material 1a in the widthwise direction is/are reliably melted by the second local heating light beam 42 as described later on.

(Step 2)

Figure 15B:
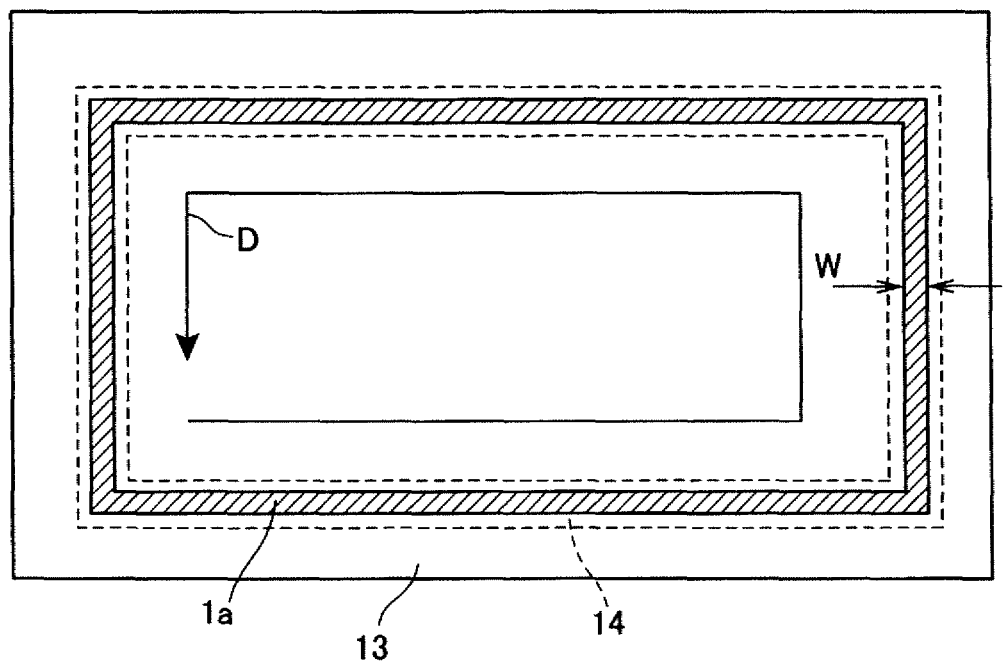

Subsequently, as shown in FIGS. 8C and 15B, the components are arranged so that the rear plate 13 (second glass base member) formed with, for example, electron emission elements 27 or the like and the frame member 14 are opposed to one another with the joining material 1a intervening therebetween. As described above, the joining material 1a is formed so that the part or parts thereof in the widthwise direction is/are allowed to protrude. Therefore, only the protruding portion or portions is/are continuously brought in contact with the rear plate 13 in the direction D (see FIG. 15B) in which the joining material 1a extends. FIG. 15B shows a plan view as viewed from a line 15B-15B shown in FIG. 8C, illustrating a state in which the frame member 14 formed with the joining material 1a and the rear plate 13 are arranged oppositely.

As shown in FIG. 8D, in order to reliably allow the joining material 1a and the rear plate 13 to be in contact with each other and uniformize the pressing force exerted on the joining material 1a, the frame member 14 is covered with a glass base member 52 (third glass base member) on the side opposite to the surface on which the joining material 1a is arranged. It is preferable to apply an auxiliary load in the thickness direction of the joining material 1a so that the joining material 1a is pressed against the rear plate 13.

(Step 3)

Figure 13A:
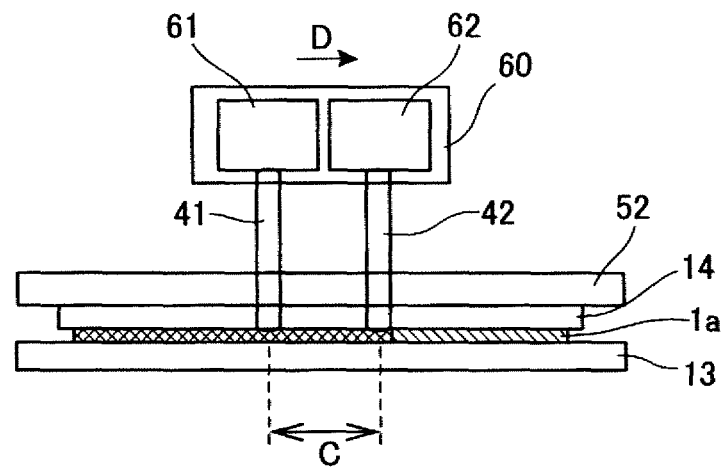
FIGS. 13A and 13B show a method for radiating the local heating light beams in relation to Examples 3 to 9.

Subsequently, as shown in FIGS. 8E and 13A, the first and second local heating light beams 41, 42 are radiated onto the joining material 1a, and the rear plate 13 and the frame member 14, which are arranged oppositely, are joined to one another. The first and second local heating light beams 41, 42 are radiated onto the joining material 1a while being moved in the direction D (see FIGS. 15B and 13A) in which the joining material 1a extends. In this procedure, the first local heating light beam 41 is moved while following the second local heating light beam 42.

With reference to FIG. 13A, a second laser head 62 for emitting the second local heating light beam 42 and a first laser head 61 for emitting the first local heating light beam 41 are fixed to a breadboard 60 so that the distance between optical axes is a predetermined spacing distance C in the direction D in which the joining material 1a extends. Accordingly, the first local heating light beam 41 is moved while following the second local heating light beam 42 at the same velocity as that of the second local heating light beam 42. The radiation position, which is brought about by the first local heating light beam 41, may be moved at the same velocity as that of the radiation position which is brought about by the second local heating light beam 42 while following the radiation position which is brought about by the second local heating light beam 42 by moving the radiation objective including the joining material 1a. Alternatively, the radiation position, which is brought about by the first local heating light beam 41, may be moved at the same velocity as that of the radiation position which is brought about by the second local heating light beam 42 while following the radiation position which is brought about by the second local heating light beam 42 by moving the breadboard 60 in the direction D.

It is appropriate that the first and second local heating light beams 41, 42 are capable of locally heating the vicinity of the joined area. The semiconductor laser is preferably used as the light source. A processing semiconductor laser, which has a wavelength in the infrared region, is preferred as the light sources of the local heating light beams 41, 42 in view of, for example, the performance to locally heat the joining material 1a and the transmission performance through the glass base member.

The joining material 1a is successively heated and melted in the direction D in which the joining material 1a extends, by being irradiated with the second local heating light beam 42. After that, the joining material 1a is cooled to a temperature of not more than the softening point. The second local heating light beam 42 is radiated while being moved in the direction in which the joining material 1a arranged on the frame member 14 extends. The joining material 1a is formed to provide a frame-shaped form as a whole on the frame member 14. In this situation, at least a part of the joining material 1a in the widthwise direction is melted, followed by being cooled so that the temperature of the joining material 1a is not more than the softening point. Accordingly, partially joined portions, in which the rear plate 13 and the frame member 14 are partially joined to one another, are successively formed in partial areas in the widthwise direction of the joining material 1a in the direction D in which the joining material 1a extends.

Figure 11B:
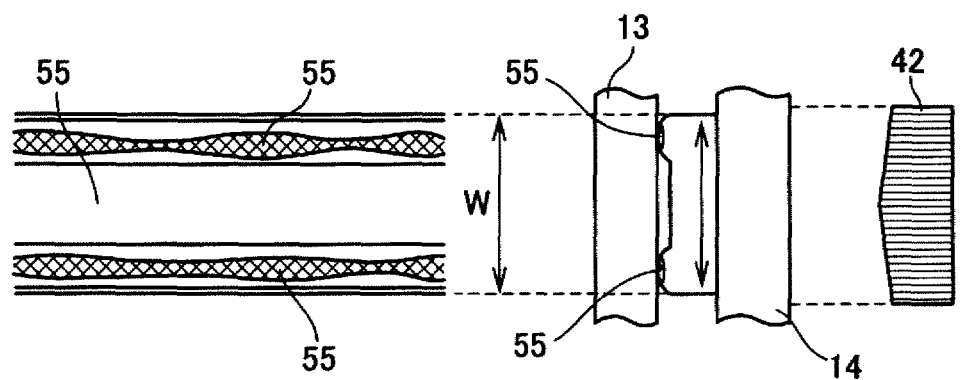
Figure 12A:
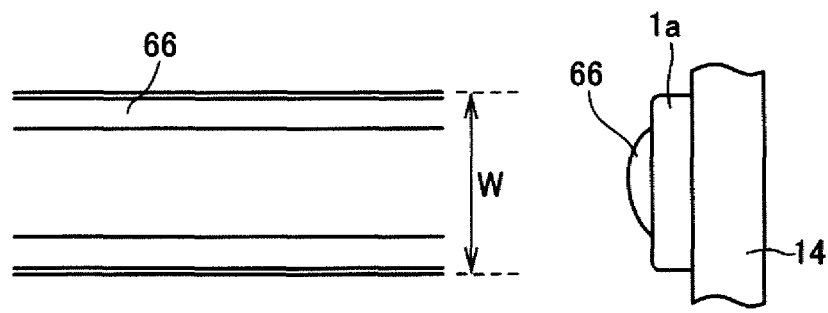
FIGS. 12A, 12B and 12C show a state of a joined area concerning Example 4.
Figure 12B:
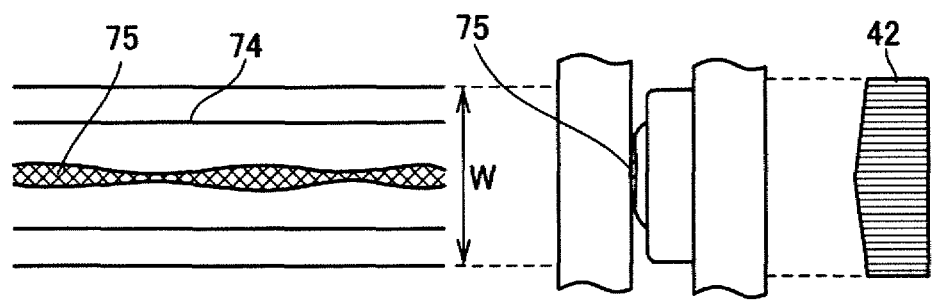

As shown in FIG. 11A, when the both side portions 46 in the widthwise direction of the joining material 1a are formed to protrude, the partially joined portions 55 are formed at the protruding portions disposed on the both side portions in the widthwise direction as shown in FIG. 11B. On the other hand, as shown in FIG. 12A, when the central portion in the widthwise direction of the joining material 1a is formed to protrude, the partially joined portion 75 is formed at the protruding portion disposed at the central portion in the widthwise direction as shown in FIG. 12B.

In order to form the partially joined portion between the frame member 14 and the rear plate 13 by radiating the second local heating light beam 42, it is appropriate that the film thickness of the joining material 1a is allowed to have a distribution in the widthwise direction as described above, and the portion, at which the partially joined portion is intended to be formed, is allowed to have a film thickness larger than film thicknesses of the other portions.

Another method is also available to form the partially joined portion between the frame member 14 and the rear plate 13 by radiating the second local heating light beam 42, wherein the beam intensity of the second local heating light beam 42 may be allowed to have a distribution in the widthwise direction of the joining material 1a. For example, when the joining material 1a, which has the film thickness distribution in the widthwise direction as described above, is replaced with a joining material which has a flat film thickness distribution in the widthwise direction, the beam profile of the second local heating light beam 42 may be changed to such a profile that the beam intensity, which is provided at the portion intended to form the partially joined portion, is stronger than the beam intensities of the other portions. When the second local heating light beam 42, which has such a beam profile that the beam intensity of the portion intended to be formed with the partially joined portion is locally strong, is radiated, the partially joined portion is formed between the frame member 14 and the rear plate 13 in the same manner as in the case in which the film thickness of the joining material 1a is allowed to have the distribution in the widthwise direction. When the beam intensity of the second local heating light beam 42 has the distribution in the widthwise direction of the joining material 1a, a distribution in the widthwise direction arises in the coefficient of expansion of the joining material 1a during the radiation of the second local heating light beam 42. Accordingly, the distribution in the widthwise direction is formed in the film thickness of the joining material 1a during the radiation of the second local heating light beam 42.

As described above, in order to form the partially joined portion, it is also appropriate to utilize the previously prepared film thickness distribution in the joining material 1a. Alternatively, the film thickness distribution in the joining material 1a, which is generated by the distribution of the coefficient of expansion of the joining material 1a during the radiation of the second local heating light beam 42, may be utilized. The distribution of the coefficient of expansion of the joining material 1a during the radiation of the second local heating light beam 42 is the distribution corresponding to the intensity distribution of the second local heating light beam 42. Further, the procedures or techniques as described above may be combined with each other.

It is desirable that the second local heating light beam 42 is radiated so that the partially joined portions 55, 75 are formed within a range of 1% to 90% of the entire width W of the joining material 1a at the respective positions in the direction in which the joining material 1a extends. It is more desirable that the second local heating light beam 42 is radiated so that the partially joined portions 55, 75 are formed within a range of 2% to 50% of the entire width W of the joining material 1a at the respective positions in the direction in which the joining material 1a extends.

As described above, in relation to the joining material 1a, the viscosity (coefficient of viscosity) has the negative temperature coefficient. Therefore, when the joining material 1a is heated and melted, then the viscosity of the joining material 1a is once lowered, and the joining material 1a is fluidized. On the other hand, when the radiation of the local heating light beam is completed, the viscosity of the joining material 1a is restored.

The joining material 1a escapes from the fluidization state when the viscosity is restored to be not less than $10^{6.7}$ (Pa·sec). The joining material 1a exerts the restraining action to some extent between the rear plate 13 and the frame member 14 on the basis of the viscous property (viscosity or stickiness) thereof. In other words, the second local heating light beam 42 temporarily joins the rear plate 13 and the frame member 14 (FIG. 8F).

It is appropriate that the partially joined portion is formed at a part of the entire width W of the joining material 1a (joining-scheduled width). The partially joined portion 55 and the unjoined area 54 as the portion formed with no partially joined portion 55 may be disposed at any position in the widthwise direction of the joining material 1a.

The purpose of the second local heating light beam 42 is to temporarily join the rear plate 13 and the frame member 14. Therefore, it is appropriate that the partially joined portions 55 are formed in the direction D while giving the continuity to such an extent that the temporary restraining action is obtained between the rear plate 13 and the frame member 14. In other words, it is appropriate that the partially joined portions 55 are formed continuously without any disconnection in the direction D. Further, it is also allowable that an area, in which the partially joined portion 55 is not formed, partially exists in the direction D. On the other hand, it is preferable that the unjoined area 54 is formed continuously in the direction D, because it is possible to efficiently discharge or exclude the air-gaps (voids) which tend to remain in the joined area.

Figure 11C:
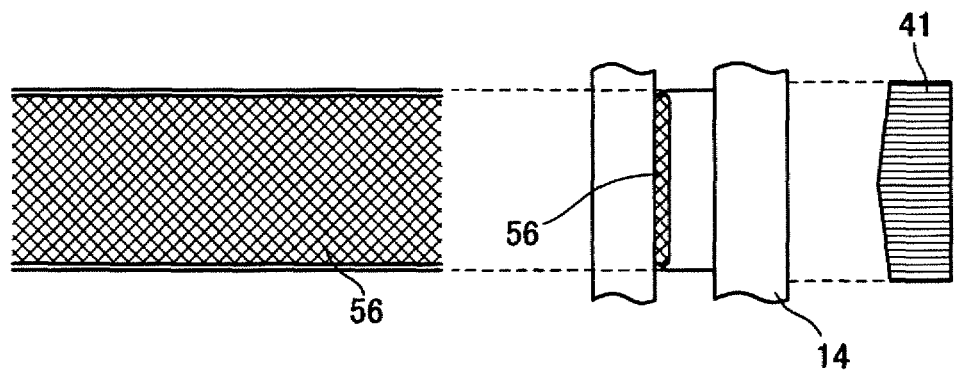
Figure 12C:
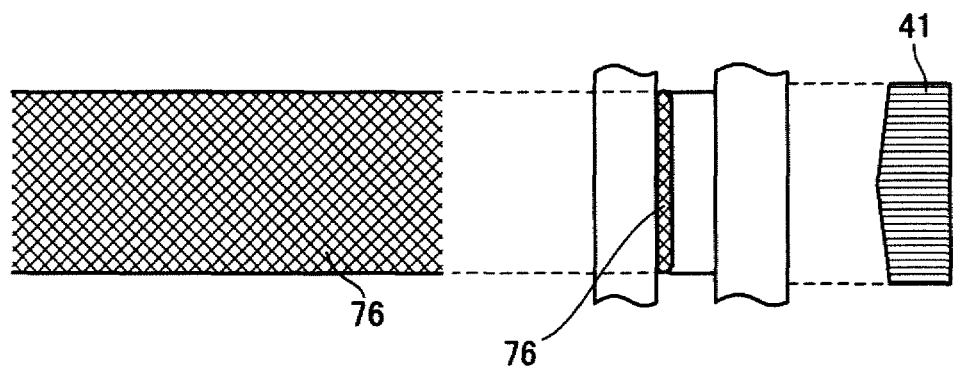

The first local heating light beam 41 is radiated after the joining material 1a, which has been melted by the radiation of the second local heating light beam 42, has a temperature of not more than the softening point at the respective positions of the joining material 1a. Specifically, the first local heating light beam 41 is radiated when the joining material 1a, which has been melted by the radiation of the second local heating light beam 42, has a viscosity of not less than $10^{6.7}$ (Pa·sec) at the respective positions of the joining material 1a. The first local heating light beam 41 successively heats and melts the partially joined portions 55, 75 again in the direction D. Further, the first local heating light beam 41 successively heats and melts the unjoined areas 54, 74 in the direction D. Thus, the joining members 56, 76, each of which joins the rear plate 13 and the frame member 14, are formed (FIGS. 11C and 12C). It is preferable that the first local heating light beam 41 has a power larger than that of the second local heating light beam 42.

In particular, the timing of radiation of the first local heating light beam 41 is such a timing that the joining material 1a, which has been in the melted state by being irradiated with the second local heating light beam 42, is cooled to provide a state in which the frame member 14 and the rear plate 13 are joined to one another by only the part of the joining material 1a in the widthwise direction. In other words, the state, in which the frame member 14 and the rear plate 13 are joined to one another by only the part in the widthwise direction, is such a state that the joining material 1a restrains the frame member 14 and the rear plate 13. This state is expressed by using the viscosity of the joining material 1a as a state in which the viscosity η (Pa·sec) of the joining material 1a resides in log η≤6.7, wherein the temperature of the joining material 1a is not more than the softening point in this state. The timing, at which the joining material 1a is in this state, is the desirable radiation timing of the first local heating light beam 41.

In order to radiate the first local heating light beam 41 when the temperature of the joining material 1a is in the state of not more than the softening point, it is necessary to ensure the period of time during which the joining material 1a is cooled after the radiation of the second local heating light beam 42. For this purpose, the distance C between the optical axes of the second laser head 62 and the first laser head 61 can be adjusted while considering the cooling speed of the joining material 1a and the scanning velocity (velocity of moving radiation) of the first and second local heating light beams 41, 42.

It is appropriate that the first local heating light beam 41 and the second local heating light beam 42 are capable of heating the desired joining-scheduled areas. Therefore, the first local heating light beam 41 and the second local heating light beam 42 may be positioned on the same side with respect to the joining objective, or they may be positioned on the mutually opposite sides.

(Step 4)

Figure 13B:
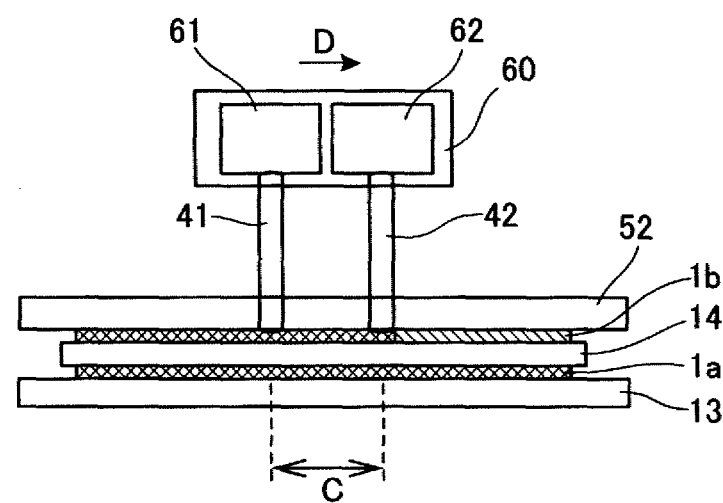

Subsequently, as shown in FIGS. 8G to 8K, the face plate 12 (first glass base member) and the frame member 14 (second glass base member) are joined to one another in accordance with the same procedures as those in Steps 1 to 3. Specifically, as shown in FIG. 8G, the face plate 12, on which fluorescent films 34 and other components are formed, is firstly prepared. Subsequently, as shown in FIG. 8H, a joining material 1b is formed in a frame-shaped form on the face plate 12 in the same manner as in Step 1. Subsequently, as shown in FIG. 8I, the face plate 12 and the frame member 14 are brought in contact with each other with the joining material 1b intervening therebetween in the same manner as in Step 2. In this procedure, the third glass base member 52 is not used. Subsequently, as shown in FIGS. 8J and 13B, the second and first local heating light beams 42, 41 are radiated in the same manner as in Step 3. Thus, as shown in FIG. 8K, an envelope 10 is formed, in which the face plate 12 and the rear plate 13 are opposed to one another with the frame member 14 intervening therebetween, and the internal space is formed. In this embodiment, the joining material 1b is formed on the face plate 12. However, the joining material 1b may be formed on the frame member 14. It is preferable that the type and the physical property of the joining material 1b, the radiation condition of the laser beam and the like are the same as or equivalent to those in Steps 1 to 3.

In the conventional technique, the laser beam is radiated onto the joining material a plurality of times. However, the joining material is heated and melted by means of the radiation performed once. Even in the case of the technique described in United States Patent Application Publication No. 2008/0171485, the area other than the partially joined area is joined by means of the radiation performed once. When the heating and the melting are performed by means of only the radiation performed once, it is necessary that the thermal energy, which is required to heat and melt the joining material, should be supplied once. Therefore, the quantity of heat, which is applied to the joining objective, is increased, and the local thermal deformation of the glass base member tends to increase at the radiation position. Therefore, the contact between the pair of glass base members to be joined is unstable, and the air-gaps (voids) tend to remain in the joining member. The voids, which remain in the joining member, cause the occurrence of any crack.

On the contrary, in this embodiment, the second local heating light beam 42 is radiated precedingly to form the partially joined portions between the rear plate 13 and the frame member 14, and the components are temporarily joined. Further, the partially joined portions are formed between the face plate 12 and the frame member 14, and the components are temporarily joined. Therefore, the contact between the both glass base members is stabilized during the radiation of the first local heating light beam 41, and the air-gaps (voids) are suppressed from remaining in the joined area. As a result, the airtightness of the joining member is enhanced.

Further, when the first local heating light beam 41 is radiated, as shown in FIG. 3, the glass base members (the rear plate 13 and the frame member 14 in the exemplary embodiment shown in the drawing) are elastically deformed (arrows A) toward the melted joining material 1a in accordance with the bimetal effect described above. Therefore, the cross-sectional area of the melted portion of the joining material 1a is tightened or narrowed at the radiation position of the first local heating light beam 41. The melted portion 77 is extruded in the direction D of movement of the first local heating light beam 41 (arrows B). Accordingly, the air-gaps (voids) contained in the melted portion are discharged or excluded as well. Therefore, it is more difficult for the air-gaps (voids) to remain.

Figure 14:
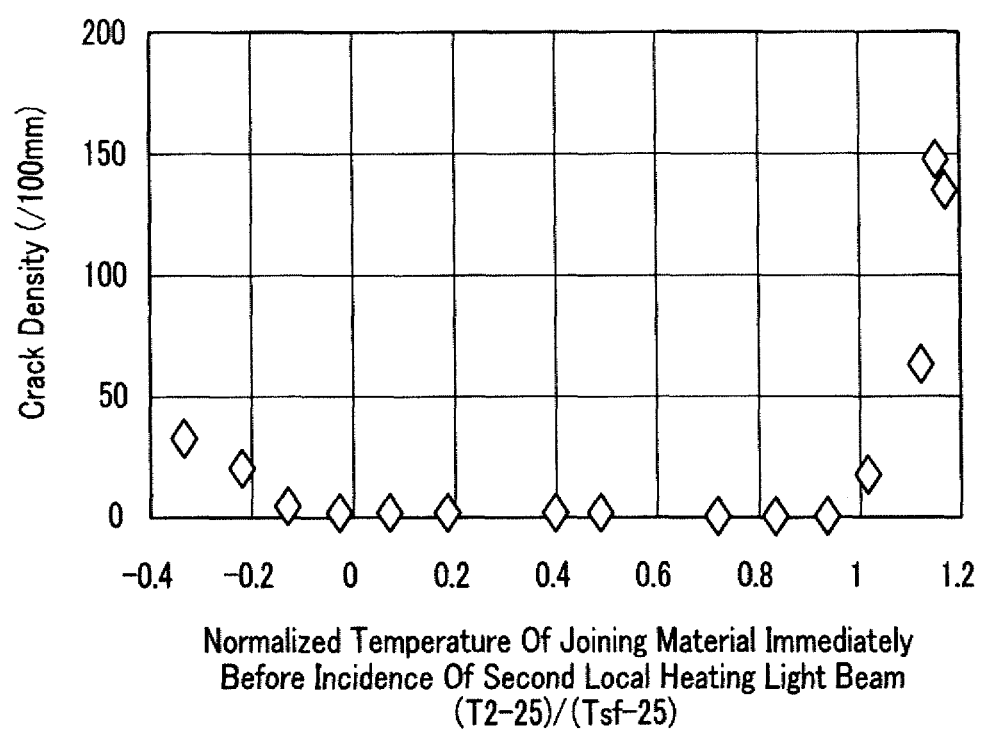
FIG. 14 shows a relationship between the temperature of the joining material and the crack density of the joining member.

Next, the proper temperature of the joining material 1a at the partially joined portion, which is provided when the first local heating light beam 41 is radiated, is determined. For this purpose, the radiation timings of the first and second local heating light beams 41, 42 were changed to determine the relationship between the density of cracks generated in the joining member 1 of a test piece and the temperature of the joining material provided immediately before the incidence of the first local heating light beam 41. The temperature of the joining material was normalized with the temperature difference from room temperature (assumed as 25° C.), and a graph shown in FIG. 14 was prepared by using the normalized temperature of the joining material as the horizontal axis. The vertical axis indicates the number of cracks per a length of 100 mm of the joining member. In FIG. 14, $T_{sf}$ represents the softening point of the joining material, and $T_2$ represents the temperature of the joining material provided immediately before the incidence of the first local heating light beam 41.

A frit (BAS 115 produced by Asahi Glass Co., Ltd.) having a width of 1 mm and a thickness of 5 μm was used as the joining material. A high strain point glass base member (PD 200 produced by Asahi Glass Co., Ltd.) was used as the glass base member subjected to the joining. The second local heating light beam 42 was radiated under a condition in which the power was 212 W, the wavelength was 808 nm, the beam diameter was 1.2 mmφ, the scanning velocity was 600 to 2000 mm/s, and the laser beam output intensity was 120 W. The first local heating light beam 41 was radiated under a condition in which the wavelength was 808 nm, the beam diameter was 1.2 mmφ, and the scanning velocity was 600 to 2000 mm/s, and the laser beam output intensity was changed within a range of 280 W to 350 W.

As shown in FIG. 14, when the temperature of the joining material, which is provided immediately before the incidence of the first local heating light beam 41, is not less than the softening point (when the value of the horizontal axis is not less than 1 in FIG. 14), the increase in the crack density is observed. In relation thereto, when the joining surface of the test piece is observed, the microcracks, which are caused by the remaining air-gaps (voids), are dominant. It is postulated that this result is caused by the fact that the restraining action, which is to be exerted on the glass base member by the partially joined portion, is not obtained sufficiently. When the temperature of the joining material, which is provided immediately before the incidence of the first local heating light beam 41, is not more than room temperature (when the value of the horizontal axis is not more than 0 in FIG. 14), the increase in the crack density is slightly observed. It is postulated that this result is caused by the fact that the stress, which has been generated in the joining material, is increased at the point in time of the radiation of the first local heating light beam 41.

According to the experimental result shown in FIG. 14, it is desirable that the first local heating light beam 41 is radiated during the period in which the temperature of the joining material melted by the radiation of the second local heating light beam 42 fulfills a range of $-0.1 \leq (T_2-25)/(T_{sf}-25) \leq 1$ at each of the positions disposed in the direction in which the joining material extends. In the expression, $T_2$ represents the temperature of the joining material, and $T_{sf}$ represents the softening point of the joining material.

As described above, the first local heating light beam 41 can be radiated in the state in which the temperature of the joining material at the partially joined portion is lowered to room temperature or any temperature of not more than room temperature, and the joining material is cooled and solidified. However, the shrinkage of the glass base member proceeds, and the tensile stress is generated in the cooling process of the joining material at the temperature of not more than the softening point temperature. Therefore, there is such a possibility that the probability of appearance of the crack may be increased in a time-dependent manner in the formed joining member. Therefore, in order to obtain the glass structural unit joined by the joining member having the high long-term reliability, it is empirically preferable that the timing, at which the first local heating light beam 41 is radiated after the radiation of the second local heating light beam 42, is the timing which satisfies the following condition. That is, it is desirable that the first local heating light beam 41 is radiated within a temperature range which satisfies such a condition that the viscosity η of the joining material is not more than $10^{18}$ (Pa·sec), i.e., log(η)≤18 is given after the radiation of the second local heating light beam 42. More preferably, it is desirable that the first local heating light beam 41 is radiated within a temperature range which satisfies such a condition that the viscosity η of the joining material is not more than $10^{13.5}$ (Pa·sec), i.e., log(η) ≤13.5 is given after the radiation of the second local heating light beam 42 in accordance with the same reason. The viscosity, which fulfills the condition of log(η)≤13.5, corresponds to the strain point temperature. Therefore, the latter radiation condition means the fact that the first local heating light beam 41 is radiated when the temperature of the joining material is within a range of not more than the softening point and not less than the strain point temperature after the radiation of the second local heating light beam 42. Accordingly, it is possible to further suppress the occurrence of the crack in the joining member.

In the embodiment explained above, the envelope 10 is produced, in which the rear plate 13 and the frame member 14 are joined to one another, the face plate 12 and the frame member 14 are further joined to one another, and thus the frame member 14 is inserted between the face plate 12 and the rear plate 13. However, more generally, the present invention provides the method for producing the airtight envelope at least a part of which is composed of the rear plate 13 and the face plate 12. Therefore, a glass base member, in which a protruding portion having a shape of the frame member 14 is integrally formed beforehand, can be used as one of the rear plate 13 and the face plate 12, and the glass base member can be joined to the other plate as well. Further, the face plate 12 and the frame member 14 can be previously joined to one another, and then the rear plate 13 and the frame member 14 can be joined to one another as well.

The embodiment explained above resides in the method for producing the airtight envelope to be used for the image display apparatus. More generally, the present invention is applicable when a first glass substrate and a second glass substrate are joined to one another. In this case, both of the first and second local heating light beams may be radiated from the side of the first glass substrate. Alternatively, one of the first and second local heating light beams may be radiated from the side of the first glass substrate, and the other may be radiated from the side of the second glass substrate. Further alternatively, both of the first and second local heating light beams may be radiated from the side of the second glass substrate.

Example 1

The present invention will be explained in detail below as specifically exemplified by Examples. In Example 1, the production method explained in the foregoing embodiment is applied to join a frame member and a rear plate in an airtight manner. Further, the frame member and a face plate are joined to one another in an airtight manner, and thus a vacuum airtight envelope is produced.

Step 1 (Formation of Joining Material on Frame Member (First Glass Base Member))

A frame member 14 was formed as the first glass base member. Specifically, at first, a high strain point glass base member having a thickness of 1.5 mm (PD 200 produced by Asahi Glass Co., Ltd.) was prepared, and the glass base member was cut out into an outer shape of 980 mm×580 mm×1.5 mm. Subsequently, a central area of 970 mm×570 mm×1.5 mm was cut out by means of the cutting processing to form the frame member 14 having a substantially rectangular cross section with a width of 5 mm and a thickness of 1.5 mm. Subsequently, the surface of the frame member 14 was degreased by means of the washing with organic solvent, the rinse with pure water, and the UV-ozone washing.

In Example 1, a glass frit was used as joining materials 1a, 1b. A paste was used as the glass frit, wherein a Bi-based glass frit containing no lead (BAS 115 produced by Asahi Glass Co., Ltd.), which had a coefficient of thermal expansion $\alpha=79\times10^{-7}/°$ C., a transition point of 357° C., and a softening point of 420° C., was used as a base material, and an organic substance was dispersed and mixed therewith as a binder. The paste was formed on the frame member 14 to provide a width of 1.5 mm and a thickness of 7 μm along the circumferential length of the frame member 14 by means of the screen printing, followed by being dried at 120° C. Subsequently, in order to burn out the organic substance, the paste was heated and calcinated at 460° C. to form the joining material 1a (FIGS. 8A and 8B).

Step 2 (Step of Bringing Frame Member, Electron Source Base Member, and Joining Material in Contact with Other)

A rear plate 13 (electron source base member) was formed as the second glass base member. Specifically, at first, a glass base member having a size of outer shape of 1000 mm×600 mm×1.8 mm (PD 200 produced by Asahi Glass Co., Ltd.) was prepared, and the surface was degreased by means of the washing with organic solvent, the rinse with pure water, and the UV-ozone washing. Subsequently, electron emission elements 27 of the surface electron conduction type and matrix wiring lines 28, 29 were formed in a central area of 960 mm×550 mm of the glass base member obtained as described above. The formed electron emission elements 27 were connected to the matrix wiring lines 28, 29 so that a number of pixels of 1920×3×1080 were successfully driven individually. Subsequently, a non-evaporable getter material composed of Ti was formed as a film having a thickness of 2 μm on the matrix wiring lines 28, 29 by means of the sputtering to form the non-evaporable getter (not shown). The rear plate 13 as the second glass base member was prepared as described above. In order to perform the vacuum evacuation, an opening (not shown) having a diameter of 3 mm to penetrate through the glass base member was previously provided in an area of the rear plate 13 in which the matrix wiring lines 28, 29 were not formed.

Subsequently, the members were temporarily assembled so that the joining material 1a was brought in contact with the surface of the rear plate 13 provided with the electron emission elements 27 while aligning the frame member 14 formed with the joining material 1a with respect to the rear plate 13. After that, in order to uniformize the pressurizing force exerted on the joining material 1a, a glass base member 52 (PD 200 produced by Asahi Glass Co., Ltd.) was auxiliarily arranged to cover the frame member 14. The glass base member 52, which had the same size as that of the rear plate 13, was used. Further, in order to assist the pressurizing force, the rear plate 13, the joining material 1a, and the frame member 14 were pressurized by means of an unillustrated pressurizing apparatus. In this way, the rear plate 13 and the frame member 14 were brought in contact with each other with the joining material 1a intervening therebetween (FIGS. 8C and 8D).

Step 3 (First Joining Step of Radiating First Local Heating Light Beam onto Joining Material) and Step 4 (Second Joining Step of Radiating Second Local Heating Light Beam onto Joining Material to Melt Joining Material Again An explanation will be made in detail with reference to FIGS. 4, 5, 6, and 8 about the joining steps to utilize the first local heating light beam which satisfies Expressions 1 and 2 and the second local heating light beam which is associated therewith as the feature of the present invention.

At first, the first local heating light beam (laser beam) was radiated onto the temporarily assembled structural unit composed of the rear plate 13, the frame member 14, and the joining material 1a manufactured in the step shown in FIG. 8D. In Example 1, two processing semiconductor laser apparatuses were prepared, and laser heads 61, 62 were fixed to a breadboard 60 at a distance between optical axes of 40 mm. The optical axis was established in the direction perpendicular to the glass base member 52 for any one of the first and second local heating light beams 41, 42. The laser head 61 was arranged so that the distance between the laser emission port and the glass base member 52 was 8 cm. The laser head 62 was arranged so that the distance between the laser emission port and the glass base member 52 was 11 cm (FIG. 5A).

The radiation condition of the first local heating light beam 41 resided in a wavelength of 980 nm, a laser power of 736 W, and an effective beam diameter of 3.5 mm, and the scanning was performed at a velocity of 600 mm/s in the scanning direction D. The radiation condition of the second local heating light beam 42 resided in a wavelength of 980 nm, a laser power of 73 W, and an effective beam diameter of 0.9 mm. The second local heating light beam 42 was subjected to the scanning while following the first local heating light beam 41 in the same direction and at the same velocity as those of the first local heating light beam 41 while maintaining the spacing distance C between the optical axes of 40 mm with respect to the first local heating light beam 41. As shown in FIG. 5C, the first local heating light beam 41 was radiated while being focused on the joining material 1a so that the entire width of the joining material 1a was included in the effective beam. As shown in FIG. 5D, the effective beam of the second local heating light beam 42 was set to include only the central portion in the widthwise direction of the joining material 1a. As shown in FIG. 5D, the distance from the end portion of the effective beam of the second local heating light beam 42 to the end portion in the widthwise direction of the joining material 1a was 0.3 mm. The first and second local heating light beams 41, 42 were subjected to the scanning by moving the radiation objective including the joining material 1a (FIGS. 8E and 5A). In this specification, the laser power was prescribed as the intensity value obtained by integrating all light fluxes allowed to outgo from the laser head. The effective beam diameter was prescribed as the range in which the intensity of the laser beam was not less than $e^{-2}$ time the peak intensity.

The steps described above were also performed in the same manner for the three remaining circumferential portions to complete the joining of the rear plate 13 and the frame member 14 (FIG. 8F).

FIG. 7D shows a cross-sectional stress distribution of the joining member of the airtight envelope produced in accordance with Example 1. The internal stress state of the joining member was observed by using a liquid crystal polarization microscope system LC-Pol Scope (produced by CRI in the United States). The end portions in the widthwise direction of the joining member 1 were the compressive stress areas 71. The compressive stress area 71 was generated at the central portion in the widthwise direction of the joining member 1 interposed between the tensile stress areas 72. The crack hardly developed owing to the formation of the compressive stress area 71 at the central portion, and the airtight envelope having the higher reliability was obtained, unlike any cross-sectional stress distribution as obtained by the whole heating system based on the use of a heating furnace or the conventional local heating system.

In the steps of radiating the first and second local heating light beams 41, 42, a radiation thermometer was set in the vicinity of the radiation positions of the first and second local heating light beams to measure the temperature of the joining material 1a. Specifically, the temperature of the joining material 1a was measured at measuring points A1 to A5 (0.1 mmφ) shown in FIG. 6.

At first, the temperature of the joining material 1a was measured at the measuring point A1 and the measuring point A2 included in the effective beam of the first local heating light beam 41. The measuring point A2 was disposed at a position separated by 1.5 mm toward the second local heating light beam 42 from the central position of the first local heating light beam 41. The measuring point A1 was disposed at a position separated by 0.6 mm in the direction perpendicular to the scanning direction of the local heating light beam from the measuring point A2. The temperature of the joining material during the radiation of the first local heating light beam 41 was 640° C. to 700° C. at the measuring point A2 and 600° C. to 690° C. at the measuring point A1. Accordingly, it was confirmed that the joining material 1a was melted at the measuring points A1, A2.

Subsequently, the temperature of the joining material 1a was measured at the measuring point A5 included in the effective beam of the second local heating light beam 42 and the measuring points A3, A4 positioned outside the effective beam of the second local heating light beam 42. The measuring point A5 was disposed at a position separated by 0.3 mm in the direction opposite to the first local heating light beam 41 from the central position of the second local heating light beam 42. The measuring point A3 was disposed at a position separated by 1.0 mm toward the first local heating light beam 41 from the central position of the second local heating light beam 42. The measuring point A4 was disposed at a position separated by 0.6 mm in the direction perpendicular to the scanning direction of the laser beam from the measuring point A5. The temperature of the joining material during the radiation of the second local heating light beam 42 was 670° C. to 710° C. at the measuring point A5. On the other hand, the temperature was 110° C. to 180° C. at the measuring point A3, and the temperature was 230° C. to 330° C. at the measuring point A4.

According to the measurement results obtained as described above, it was confirmed that the joining material 1a was melted by the radiation of the first local heating light beam 41, the joining material 1a was thereafter once cooled to the temperature of not more than the softening point, and the joining material 1a was subsequently melted again by the radiation of the second local heating light beam 42. Additionally, it was confirmed that the joining material 1a was retained at the temperature of not more than the softening point at the positions disposed around the radiation position of the second local heating light beam 42 including those disposed in the direction (widthwise direction) perpendicular to the scanning direction as well. In Example 1, the temperature of the joining material was confirmed by observing the indication of the radiation thermometer while radiating the laser beam. However, the temperature may be measured by bringing a thermocouple in contact with the joining material.

Step 5 (Step of Preparing Frame Member, Joining Material, and Face Plate)

Subsequently, PD 200 produced by Asahi Glass Co., Ltd. having the same size of outer shape as that of the rear plate was used as the glass base member in the same manner as the rear plate 13 to manufacture a face plate 12 provided with fluorescent films 34 and the like.

Step 6 (Step of Bringing Frame Member, Joining Material, and Face Plate in Contact with Each Other), Step 7 (First Joining Step of Radiating First Local Heating Light Beam onto Joining Material), and Step 8 (Second Joining Step of Radiating Second Local Heating Light Beam onto Joining Material to Melt Joining Material Again)

The face plate 12 and the frame member 14 were joined to one another by using the first and second local heating light beams 41, 42 in the same manner as in Steps 1 to 4 to complete the airtight envelope. The glass base member 52 was not used in Steps 6 to 8. The radiation condition of the laser beam and the scanning method resided in the same conditions as those of Steps 3 and 4. The positional relationship between the laser heads 61, 62 and the radiation objective was as shown in FIG. 5B. In Steps 5 to 8, the frit paste was not formed on the frame member 14 unlike Steps 1 to 4, but the frit paste was formed on the face plate 12. Other procedures were the same as or equivalent to those in Steps 1 to 4 to join the face plate 12 and the frame member 14 (FIGS. 8G to 8K and FIG. 5B).

The FED apparatus was manufactured as described above. When the apparatus was operated, the electron emission performance and the image display performance were stably maintained for a long period of time. It was confirmed that the joining member secured the stable airtightness and the strength of such an extent that the strength is applicable to FED.

In relation to the first local heating light beam 41 and the frame member 14, there are provided in the step 3 under the condition of Example 1:

$\phi = 3.5$ mm $w = 1.5$ mm $v = 600$ mm/s $d = 1.5$ mm $a = 4.5 \times 10^{-1}$ mm$^2$/s from which the following expressions are provided:

$\phi/v = 5.8 \times 10^{-3}$ $(d/8)^2/12a = 6.5 \times 10^{-3}$ wherein it has been confirmed that the radiation of the first local heating light beam 41 fulfills Expressions 1 and 2.

Similarly, in relation to the first local heating light beam 41 and the face plate 12, there are provided in the step 7 under the condition of Example 1:

$\phi = 3.5$ mm $w = 1.5$ mm $v = 600$ mm/s $d = 1.8$ mm $a = 4.5 \times 10^{-1}$ mm$^2$/s from which the following expressions are provided:

$\phi/v = 5.8 \times 10^{-3}$ $(d/8)^2/12a = 9.4 \times 10^{-3}$ wherein it has been confirmed that the radiation of the first local heating light beam 41 fulfills Expressions 1 and 2.

The vacuum airtight envelope manufactured in Example 1 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7D were formed at the central positions in the widthwise direction of the joining members and the end portions of the joining member for joining the rear plate 13 and the frame member 14 and the joining member for joining the face plate 12 and the frame member 14.

Example 2

Figure 9A:
FIGS. 9A, 9B, 9C, 9D, 9E, 9F, 9G, 9H, 9I and 9J show a method for producing an airtight envelope concerning Example 2.
Figure 9B:
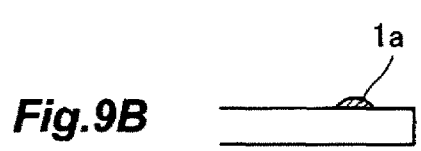
Figure 9C:
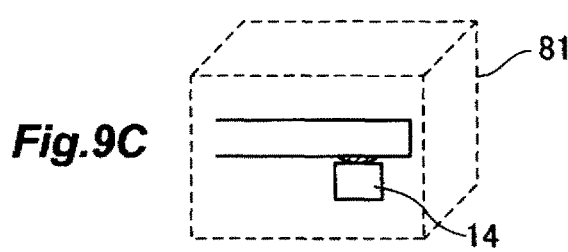
Figure 9D:
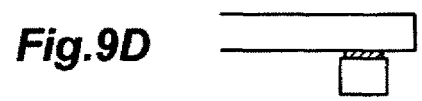
Figure 9E:
Figure 9F:
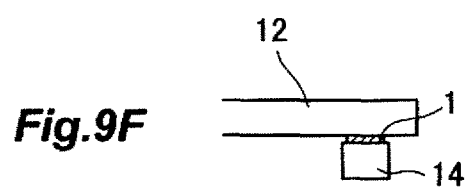
Figure 9G:
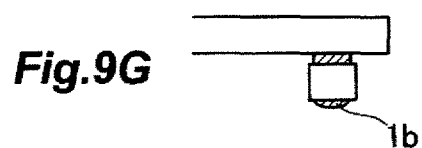
Figure 9H:
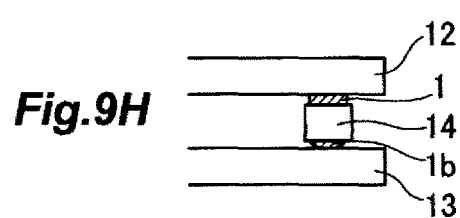

In Example 2, as shown in FIG. 9, a face plate 12 and a frame member 14 were firstly joined to one another (FIGS. 9A to 9F). Specifically, the face plate 12 and the frame member 14 were joined to one another (FIG. 9C) by means of the whole heating based on the use of a heating furnace 81 without using the first local heating light beam. After that, the second local heating light beam 42 (identical with the second local heating light beam 42 in Example 1) was radiated onto a joining material 1a in the same manner as in Step 4 in Example 1 to join the face plate 12 and the frame member 14 to one another (FIG. 9E). An atmospheric furnace was used as the heating furnace 81. An assembly of the face plate 12, the frame member 14, and the joining material 1a was retained at a temperature of 500° C. for 30 minutes in the heating furnace 81. After that, the frame member 14 and a rear plate 13 were joined to one another in accordance with a method which was the same as or equivalent to that in Steps 3 and 4 of Example 1 to manufacture an airtight envelope (FIGS. 9G to 9J). The other steps were performed in the same manner as in Example 1.

As for the joining member for joining the face plate 12 and the frame member 14, the compressive stress area was formed at the central portion in the widthwise direction of the joining member, and the tensile stress areas were formed on the both sides to interpose the compressive stress area therebetween. Therefore, even when any crack appears from the end portion in the widthwise direction of the joining member by the external force allowed to act on the joining member, the airtightness is maintained for a long period of time, because the development of the crack is prohibited in the compressive stress area disposed at the central portion. As for the joining member for joining the rear plate 13 and the frame member 14, the compressive stress areas were formed at the central portion in the widthwise direction and the end portions in the widthwise direction of the joining member, and the tensile stress areas were formed to be interposed therebetween, in the same manner as in Example 1. Therefore, the crack hardly develops, in addition to which it is possible to preferably suppress the occurrence of the crack itself in the joining member by the external force. Therefore, the airtightness can be maintained more stably for a long period of time.

The FED apparatus was manufactured as described above. When the apparatus was operated, the electron emission performance and the image display performance were stably maintained for a long period of time. It was confirmed that the joining member secured the stable airtightness and the strength of such an extent that the strength is applicable to FED.

Figure 9I:
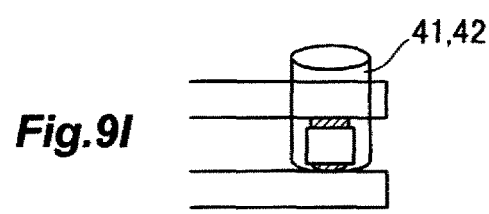
Figure 9J:
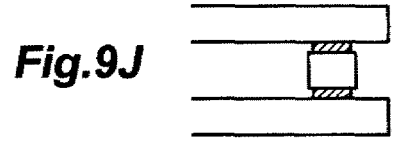

In relation to the first local heating light beam 41 and the integrated unit of the face plate 12, the frame member 14, and the joining material 1*a*, there are provided in the step of FIG. 9I under the condition of Example 2:

$\phi=3.5$ mm $w=1.5$ mm $v=600$ mm/s $d=3.3$ mm $a=4.5\times10^{-1}$ mm$^2$/s from which the following expressions are provided:

$\phi/v=5.8\times10^{-3}$ $(d/8)^2/12a=3.2\times10^{-2}$ wherein it has been confirmed that the radiation of the first local heating light beam 41 fulfills Expressions 1 and 2.

The vacuum airtight envelope manufactured in Example 2 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14, was investigated to confirm the elastic deformation in the directions directed to the inside of the base members, of the glass base members in the vicinity of the end portions of the joining members. It was confirmed that the compressive stress areas 71 as shown in FIG. 7D were formed at the central positions in the widthwise direction of the joining members and the end portions of the joining member for joining the rear plate 13 and the frame member 14.

Example 3

The airtight joining was performed for a frame member and a rear plate by applying the embodiment described above, and the airtight joining was further performed for the frame member and a face plate to produce a vacuum airtight envelope.

(Step 1)

At first, a frame member 14 was formed. Specifically, a high strain point glass base member having a thickness of 1.5 mm (PD 200) was cut out into an outer shape of 980 mm×580 mm×1.5 mm. Subsequently, a central area of 970 mm×560 mm×1.5 mm was cut out by means of the cutting processing to form the frame member 14 having a substantially rectangular cross section with a width of 5 mm and a thickness of 1.5 mm. Subsequently, the surface of the frame member 14 was degreased by means of the washing with organic solvent, the rinse with pure water, and the UV-ozone washing.

Subsequently, a joining material 1*a* was formed on the frame member 14. In Example 3, a glass frit was used as the joining material 1*a* (equivalently as a joining material 1*b* as well). The glass frit, which was used, was a paste wherein a Bi-based glass frit containing no lead (BAS 115), which had a coefficient of thermal expansion $\alpha=79\times10^{-7}/°$ C., a transition point of 357° C., and a softening point of 420° C., was used as a base material, and an organic substance was dispersed and mixed therewith as a binder. Subsequently, the joining material 1*a*, which had a width of 1 mm and a thickness of 7 μm, was formed along the circumferential length on the frame member 14 by means of the screen printing, followed by being dried at 120° C. Further, in order to burn out the organic substance, the heating and the calcination were performed at 460° C. to form the joining material 1*a* (FIGS. 8A and 8B). The joining material 1*a* exhibited such a cross-sectional profile that the both sides in the widthwise direction of the joining material 1*a* protruded by 1.5 μm with respect to the central portion on account of the shrinkage during the drying process after the screen printing (FIG. 11A).

(Step 2)

Subsequently, an electron emission element substrate (board) was prepared as a rear plate 13, wherein electron emission elements 27 and driving matrix wiring lines 28, 29 were previously formed on a glass base member composed of a high strain point glass base member (PD 200) having an size of outer shape of 1000 mm×600 mm×1.8 mm. Subsequently, the frame member 14 formed with the joining material 1*a* and the rear plate 13 were arranged oppositely so that they are brought in contact with each other with the joining material 1*a* intervening therebetween. Specifically, the frame member 14 and the rear plate 13 were opposed to one another and they were brought in contact with each other while performing the alignment so that the surface of the frame member 14, on which the joining material 1*a* was formed, was opposed to the surface of the rear plate 13 (surface disposed on the inner surface side of the airtight envelope) on which the electron emission elements 27 were formed. In order to uniformize the pressing force exerted on the joining material 1*a*, a third glass base member 52, which was composed of the high strain point glass base member (PD 200) and which had the same size as that of the rear plate 13, was placed on the frame member 14. Further, the third glass base member 52 was pressed by an unillustrated pressurizing apparatus in order to assist the pressing force. The rear plate 13 and the frame member 14 were brought in contact with each other with the joining material 1*a* intervening therebetween as described above (FIGS. 8C and 8D).

(Step 3)

Subsequently, the laser beams were radiated onto the temporarily assembled structural unit composed of the rear plate 13, the frame member 14, the joining material 1a, and the third glass base member 52. Two processing semiconductor laser apparatuses were prepared as laser light sources. Laser heads 61, 62 were fixed to a breadboard 60 at a distance between optical axes of 50 mm. Any one of the laser heads 61, 62 was set so that the optical axis of each of the first and second local heating light beams 41, 42 is perpendicular to the third glass base member 52. Each of the laser heads 61, 62 was arranged so that the distance between the laser emission port and the third glass base member 52 was 10 cm (FIG. 13A).

The second local heating light beam 42 was a laser beam having a wavelength of 980 nm, a laser power of 212 W, and an effective diameter of 2 mm, and the second local heating light beam 42 was subjected to the scanning at a velocity of 1000 mm/s in the direction D (FIG. 8E). The first local heating light beam 41 was a laser beam having a wavelength of 980 nm, a laser power of 298 W, and an effective diameter of 2 mm, and the first local heating light beam 41 was subjected to the scanning to follow the second local heating light beam 42 at the same velocity in the same direction while maintaining the distance C between the optical axes of 50 mm with respect to the second local heating light beam 42. The laser power was defined as the intensity value obtained by integrating all light fluxes allowed to outgo from the laser head. The effective diameter was defined as the diameter within the intensity range of $e^{-2}$ (e: natural logarithm) of the peak intensity. The first and second local heating light beams 41, 42 were radiated so that the effective diameter of each of them included the width W of the joining material 1a and each of them was focused on the joining material 1a. The step as described above was performed for one side of each of the rear plate 13 and the frame member 14, and the step was further carried out for the remaining three sides in the same manner as described above. Thus, the joining of the frame member 14 to the rear plate 13 was completed (FIG. 8F).

In order to confirm the states of the joining member before and after the radiation of the first and second local heating light beams 41, 42, the joined state was confirmed by means of an unillustrated radiation thermometer and an unillustrated high speed camera in which the observing range was set in the vicinity of the radiation positions of the laser heads. The left drawing of FIG. 11A shows a situation of contact between the rear plate 13 and the frame member 14 before the radiation of the first local heating light beam 41. It was confirmed that the both side portions 46, which were disposed in the widthwise direction of the joining material 1a, were brought in contact with the rear plate 13. FIG. 11B shows a situation of the joining material 1a provided immediately before the radiation of the first local heating light beam 41 after the radiation of the second local heating light beam 42. The temperature of the joining material 1a was 250° C. to 270° C. as indicated by measured values of the radiation thermometer, which was not more than the softening point of the joining material 1a. Accordingly, it was confirmed that the portions, which were disposed in the vicinity of the contact portions with respect to the rear plate 13 at the both side portions 46 of the joining material 1a, were heated and melted by the radiation of the second local heating light beam 42, followed by being cooled to the temperature of not more than the softening point to form partially joined portions 55 at the both side portions in the widthwise direction of the joining material 1a. FIG. 11C shows a situation of the joining member 1 after the radiation of the first local heating light beam 41. It was confirmed that the entire region in the widthwise direction of the joining material 1a was heated and melted and the final joining member 56 was obtained.

The joined state between the rear plate 13 and the frame member 14 was confirmed by means of an optical microscope. As a result, it was confirmed that the satisfactory joining involving no air-gap (void) was obtained over the substantially entire width W of the joining material 1a.
(Step 4)

Subsequently, a face plate 12, which was formed with fluorescent films and other components and which had the same size of outer shape as that of the rear plate 13, was prepared. The face plate 12 and the frame member 14 were joined to one another in accordance with the same or equivalent procedures as those in Steps 1 to 3 described above. In Step 4, the third glass base member 52 for the pressing was not used, and the laser beams were directly radiated from the positions disposed over or above the face plate 12. The joining material 1b was formed on the face plate 12, and the radiation condition of the laser beam (for example, the arrangement condition and the specification of the laser head) was the same as that in Step 3 (FIGS. 8G to 8K, FIG. 13B).

The airtight envelope was manufactured as described above, and the FED apparatus was completed in accordance with the ordinary method. When the completed FED was operated, it was confirmed that the electron emission and the image display were successfully performed stably for a long period of time, and the stable airtightness, which was to such an extent that the airtightness was applicable to FED, was secured.

In relation to the first local heating light beam 41 and the frame member 14, there are provided in the step 3 under the condition of Example 3:

$\phi=2$ mm $w=1$ mm $v=1000$ mm/s $d=1.5$ mm $a=4.6\times10^{-1}$ mm$^2$/s from which the following expressions are provided:

$\phi/v=2\times10^3$ $(d/8)^2/12a=6.4\times10^{-3}$ wherein it has been confirmed that the radiation of the first local heating light beam 41 fulfills Expressions 1 and 2.

Similarly, in relation to the first local heating light beam 41 and the face plate 12, there are provided in the step 4 under the condition of Example 3:

$\phi=2$ mm $w=1$ mm $v=1000$ mm/s $d=1.8$ mm $a=4.6\times10^{-1}$ mm$^2$/s from which the following expressions are provided:

$\phi/v=2\times10^3$ $(d/8)^2/12a=9.2\times10^{-3}$ wherein it has been confirmed that the radiation of the first local heating light beam 41 fulfills Expressions 1 and 2.

The vacuum airtight envelope manufactured in Example 3 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14 and the joining member for joining the face plate 12 and the frame member 14.

Example 4

Example 4 is the same as or equivalent to Example 3 except that a central portion in the direction of the width W of the joining material 1a was formed to be higher than the surroundings thereof by 1.3 μm as shown in FIG. 12A. Such a cross-sectional profile of the joining material, in which the central portion has the protruding shape as described above, can be obtained, for example, by applying the joining material twice while changing the width of the joining material. The joining material 1a was brought in contact with the rear plate 13 at the central portion 66 in the widthwise direction before the radiation of the second local heating light beam 42. After the radiation of the second local heating light beam 42, as shown in FIG. 12B, a partially joined portion 75 was formed in a range which was approximately the same as the portion brought in contact with the rear plate 13. In this situation, the temperature of the joining material 1a was 210 to 260° C. as indicated by the measured value of the radiation thermometer, which was the temperature of not more than the softening point. After the radiation of the first local heating light beam 41, as shown in FIG. 12C, the entire region in the widthwise direction of the joining material 1a was heated and melted, and the final joining member 76 was obtained.

The joined state between the rear plate 13 and the frame member 14 was confirmed by means of an optical microscope. As a result, it was confirmed that the satisfactory joining involving no air-gap (void) was obtained over the substantially entire width W of the joining material 1a.

The airtight envelope was manufactured as described above, and the FED apparatus was completed in accordance with the ordinary method. When the completed FED was operated, it was confirmed that the electron emission and the image display were successfully performed stably for a long period of time, and the stable airtightness, which was to such an extent that the airtightness was applicable to FED, was secured.

In relation to the first local heating light beam 41 and the frame member 14, there are provided in the step 3 under the condition of Example 4:

$\phi=2$ mm $w=1$ mm $v=1000$ mm/s $d=1.5$ mm $a=4.6\times10^{-1}$ mm$^2$/s from which the following expressions are provided:

$\phi/v=2\times10^3$ $(d/8)^2/12a=6.4\times10^{-3}$ wherein it has been confirmed that the radiation of the first local heating light beam 41 fulfills Expressions 1 and 2.

Similarly, in relation to the first local heating light beam 41 and the face plate 12, there are provided in the step 4 under the condition of Example 4:

$\phi=2$ mm $w=1$ mm $v=1000$ mm/s $d=1.8$ mm $a=4.6\times10^{-1}$ mm$^2$/s from which the following expressions are provided:

$\phi/v=2\times10^3$ $(d/8)^2/12a=9.2\times10^{-3}$ wherein it has been confirmed that the radiation of the first local heating light beam 41 fulfills Expressions 1 and 2.

The vacuum airtight envelope manufactured in Example 4 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14 and the joining member for joining the face plate 12 and the frame member 14.

Example 5

Example 5 was the same as or equivalent to Example 3 except that the joining material 1a was formed on the rear plate 13 which was the base member disposed on the distal side as viewed from the laser head as shown in FIG. 16. The temperatures of the joining materials 1a, 1b, which were obtained immediately before the radiation of the first local heating light beam 41, were 250 to 290° C. as indicated by the measured values of the radiation thermometer, which were not more than the softening points of the joining materials 1a, 1b.

The airtight envelope was manufactured as described above, and the FED apparatus was completed in accordance with the ordinary method. When the completed FED was operated, it was confirmed that the electron emission and the image display were successfully performed stably for a long period of time, and the stable airtightness, which was to such an extent that the airtightness was applicable to FED, was secured.

The joining material 1b is formed on the frame member 14 in Example 5. However, the joining material 1b can be formed on the face plate 12 as well.

In relation to the first local heating light beam 41 and the frame member 14, there are provided in the step of FIG. 16E under the condition of Example 5:

$\phi=2$ mm $w=1$ mm $v=1000$ mm/s $d=1.5$ mm $a=4.6\times10^{-1}$ mm$^2$/s from which the following expressions are provided:

$\phi/v=2\times10^3$ $(d/8)^2/12a=6.4\times10^{-3}$ wherein it has been confirmed that the radiation of the first local heating light beam 41 fulfills Expressions 1 and 2.

Similarly, in relation to the first local heating light beam 41 and the face plate 12, there are provided in the step of FIG. 16I under the condition of Example 5:

$\phi=2$ mm $w=1$ mm $v=1000$ mm/s $d=1.8$ mm $a=4.6\times10^{-1}$ mm$^2$/s from which the following expressions are provided:

$\phi/v=2\times10^3$ $(d/8)^2/12a=9.2\times10^{-3}$ wherein it has been confirmed that the radiation of the first local heating light beam 41 fulfills Expressions 1 and 2.

The vacuum airtight envelope manufactured in Example 5 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14 and the joining member for joining the face plate 12 and the frame member 14.

Example 6

In Example 6, the face plate 12 and the frame member 14 were joined to one another by means of the whole heating, and then the rear plate 13 and the frame member 14 were laser-joined to one another in the same manner as in Example 3. The temperature of the joining material 1a, which was obtained immediately before the radiation of the first local heating light beam 41, was 260 to 290° C. as indicated by the measured value of the radiation thermometer, which was not more than the softening point of the joining materials 1a.

The airtight envelope was manufactured as described above, and the FED apparatus was completed in accordance with the ordinary method. When the completed FED was operated, it was confirmed that the electron emission and the image display were successfully performed stably for a long period of time, and the stable airtightness, which was to such an extent that the airtightness was applicable to FED, was secured.

Any member, which tends to be affected by the heat, is not installed on the face plate 12 unlike the rear plate 13. Therefore, it is possible to adopt the production method as described above.

In relation to the first local heating light beam 41 and the integrated unit of the face plate 12, the frame member 14, and the joining material 1a, there are provided in the step 4 of FIG. 9I under the condition of Example 6:

$\phi=2$ mm $w=1$ mm $v=1000$ mm/s $d=3.3$ mm $a=4.6\times10^{-1}$ mm$^2$/s from which the following expressions are provided:

$\phi/v=2\times10^3$ $(d/8)^2/12a=3.1\times10^{-2}$ wherein it has been confirmed that the radiation of the first local heating light beam 41 fulfills Expressions 1 and 2.

The vacuum airtight envelope manufactured in Example 6 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14.

Example 7

Example 7 was the same as or equivalent to Example 3 except that the distance (50 mm) between the optical axes of the first local heating light beam 41 and the second local heating light beam 42 in Example 3 was changed to 200 mm. The temperature of the joining material 1a, which was obtained immediately before the radiation of the first local heating light beam 41, was 150 to 190° C. as indicated by the measured value of the radiation thermometer, which was not more than the softening points of the joining materials 1a, 1b. It was confirmed that only parts of the joining materials 1a, 1b in the widthwise direction were subjected to the joining, and a temporary fixed state was obtained.

The airtight envelope was manufactured as described above, and the FED apparatus was completed in accordance with the ordinary method. When the completed FED was operated, it was confirmed that the electron emission and the image display were successfully performed stably for a long period of time, and the stable airtightness, which was to such an extent that the airtightness was applicable to FED, was secured.

In relation to the first local heating light beam 41 and the frame member 14, there are provided in the step 3 of FIG. 8E under the condition of Example 7:

$\phi=2$ mm $w=1$ mm $v=1000$ mm/s $d=1.5$ mm $a=4.6\times10^{-1}$ mm$^2$/s from which the following expressions are provided:

$\phi/v=2\times10^3$ $(d/8)^2/12a=6.4\times10^{-3}$ wherein it has been confirmed that the radiation of the first local heating light beam 41 fulfills Expressions 1 and 2.

Similarly, in relation to the first local heating light beam 41 and the face plate 12, there are provided in the step 4 of FIG. 8J under the condition of Example 7:

$\phi=2$ mm $w=1$ mm $v=1000$ mm/s $d=1.8$ mm $a=4.6\times10^{-1}$ mm$^2$/s from which the following expressions are provided:

$\phi/v=2\times10^3$ $(d/8)^2/12a=9.2\times10^{-3}$ wherein it has been confirmed that the radiation of the first local heating light beam 41 fulfills Expressions 1 and 2.

The vacuum airtight envelope manufactured in Example 7 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14 and the joining member for joining the face plate 12 and the frame member 14.

Example 8

Example 8 was the same as or equivalent to Example 3 except that only the first local heating light beam 41 was radiated without performing the radiation of the second local heating light beam 42.

In relation to the first local heating light beam 41 and the frame member 14, there are provided in the step 3 of FIG. 8E under the condition of Example 8:

$\phi=2$ mm $w=1$ mm $v=1000$ mm/s $d=1.5$ mm $a=4.6\times10^{-1}$ mm$^2$/s from which the following expressions are provided:

$\phi/v=2\times10^3$ $(d/8)^2/12a=6.4\times10^{-3}$ wherein it has been confirmed that the radiation of the first local heating light beam 41 fulfills Expressions 1 and 2.

Similarly, in relation to the first local heating light beam 41 and the face plate 12, there are provided in the step 4 of FIG. 8J under the condition of Example 8:

$\phi=2$ mm $w=1$ mm $v=1000$ mm/s $d=1.8$ mm $a=4.6\times10^{-1}$ mm$^2$/s from which the following expressions are provided:

$\phi/v=2\times10^3$ $(d/8)^2/12a=9.2\times10^{-3}$ wherein it has been confirmed that the radiation of the first local heating light beam 41 fulfills Expressions 1 and 2.

The vacuum airtight envelope manufactured in Example 8 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14 and the joining member for joining the face plate 12 and the frame member 14.

Example 9

Example 9 was the same as or equivalent to Example 3 except that the distance (50 mm) between the optical axes of the first local heating light beam 41 and the second local heating light beam 42 in Example 3 was changed to 2 mm.

In relation to the first local heating light beam 41 and the frame member 14, there are provided in the step 3 of FIG. 8E under the condition of Example 9:

$\phi=2$ mm $w=1$ mm $v=1000$ mm/s $d=1.5$ mm $a=4.6\times10^{-1}$ mm$^2$/s from which the following expressions are provided:

$\phi/v=2\times10^{-3}$ $(d/8)^2/12a=6.4\times10^{-3}$ wherein it has been confirmed that the radiation of the first local heating light beam 41 fulfills Expressions 1 and 2.

Similarly, in relation to the first local heating light beam 41 and the face plate 12, there are provided in the step 4 of FIG. 8J under the condition of Example 9:

$\phi=2$ mm $w=1$ mm $v=1000$ mm/s $d=1.8$ mm $a=4.6\times10^{-1}$ mm$^2$/s from which the following expressions are provided:

$\phi/v=2\times10^{-3}$ $(d/8)^2/12a=9.2\times10^{-3}$ wherein it has been confirmed that the radiation of the first local heating light beam 41 fulfills Expressions 1 and 2.

The vacuum airtight envelope manufactured in Example 9 was arranged in a pressure-reduced chamber of 10 kPa for 100 hours. It was confirmed that the development of any crack to arrive at the end portion of the joining member and the decrease in the degree of vacuum were not caused. A cross-sectional sample or specimen, which included the end portions of the joining member for joining the rear plate 13 and the frame member 14 and the joining member for joining the face plate 12 and the frame member 14, was investigated to confirm the elastic deformation in the directions directed to the inside of the base members, of the glass base members in the vicinity of the end portions of the joining members. The stress distribution was evaluated, and it was confirmed that the compressive stress areas 71 as shown in FIG. 7C were formed at the end portions of the joining member for joining the rear plate 13 and the frame member 14 and the joining member for joining the face plate 12 and the frame member 14.

As exemplified by Examples 8 and 9, the compressive stress areas 71 are formed at least at the end portions in the widthwise direction of the joining member by performing the radiation of the first local heating light beam at the beam diameter $\phi$ and the velocity of movement v which satisfy Expressions 1 and 2 with respect to the thickness d of the glass base member, the thermal diffusivity a of the glass base member, and the width w of the joining material. Therefore, it is possible to obtain the joined unit of glass base members, the airtight envelope, or the glass structural unit subjected to the joining with the joining member capable of preferably suppressing the appearance of any crack by the external force.

In Examples 1 to 7, the auxiliary radiation of the second local heating light beam is performed in addition to the main radiation performed with the first local heating light beam to fulfill the radiation condition represented by Expressions 1 and 2. Accordingly, the joined unit of glass base members, the airtight envelope, or the glass structural unit, which is subjected to the joining with the joining member capable of further suppressing the appearance and the development of the crack, is obtained.

As exemplified by Examples 1 and 2, the compressive stress area 71 is also formed at the central portion in the widthwise direction of the joining member by performing the auxiliary radiation of the second local heating light beam for heating and melting only the central portion in the widthwise direction of the joining material while following the main radiation with the first local heating light beam. Therefore, it is possible to suppress the development of the crack more reliably.

As exemplified by Examples 3 to 7, the pair of glass base members can be temporarily fixed when the main radiation is performed, by performing the auxiliary radiation of the second local heating light beam for heating and melting only the part of the joining material in the widthwise direction prior to the main radiation with the first local heating light beam. Accordingly, it is possible to more stably perform the joining effected by the main radiation, it is possible to preferably suppress the remaining of air-gaps (voids) at the inside of the joining member, and it is possible to suppress the appearance of the crack from the inside of the joining member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-250277, filed on Oct. 30, 2009, Japanese Patent Application No. 2010-059377, filed on Mar. 16, 2010, Japanese Patent Application No. 2010-200173, filed on Sep. 7, 2010, which are hereby incorporated by reference herein in their entirety.

What is claimed is:
1. A joined unit of glass base members, comprising:
a first glass base member;
a second glass base member; and
a joining member which joins the first glass base member and the second glass base member, the joining member (a) having a viscosity that has a negative temperature coefficient, and (b) extending at a predetermined width along opposing surfaces of the first glass base member and the second glass base member,
wherein at least one of the first glass base member and the second glass base member is elastically deformed while being depressed in an internal direction of the glass base member at an end portion in a widthwise direction of the joining member, wherein a boundary between an elastically deformed portion of the glass base member and the joining member is positioned farther toward an internal side of the glass base member as compared with a boundary between a non-elastically deformed portion of the glass base member and the joining member, wherein an area formed at the end portion in the widthwise direction of the joining member has a residual stress in a thickness direction of the joining member that is a compressive stress, and wherein the area formed at the end portion in the widthwise direction of the joining member has a greater compressive stress than a compressive stress of an area formed at a central portion in the widthwise direction of the joining member.

2. The joined unit of glass base members according to claim 1, wherein the area formed at the central portion in the widthwise direction of the joining member has a residual stress in the thickness direction of the joining member that is a compressive stress, and wherein an area having a residual stress in the thickness direction of the joining member that is a tensile stress is formed adjacently to (a) the area formed at the central portion in the widthwise direction of the joining member and which has a compressive stress and (b) the area formed at the end portion in the widthwise direction of the joining member and which has a compressive stress.

3. An airtight envelope comprising:
a first glass base member;
a second glass base member; and
a joining member which joins the first glass base member and the second glass base member, the joining member (a) having a viscosity that has a negative temperature coefficient, and (b) extending at a predetermined width along opposing surfaces of the first glass base member and the second glass base member, wherein at least one of the first glass base member and the second glass base member is elastically deformed while being depressed in an internal direction of the glass base member at an end portion in a widthwise direction of the joining member, wherein a boundary between an elastically deformed portion of the glass base member and the joining member is positioned farther toward an internal side of the glass base member as compared with a boundary between a non-elastically deformed portion of the glass base member and the joining member, wherein an area formed at the end portion in the widthwise direction of the joining member has a residual stress in a thickness direction of the joining member that is a compressive stress, and wherein the area formed at the end portion in the widthwise direction of the joining member has a greater compressive stress than a compressive stress of an area formed at a central portion in the widthwise direction of the joining member.

4. The airtight envelope according to claim 3, wherein the area formed at the central portion in the widthwise direction of the joining member has a residual stress in the thickness direction of the joining member that is a compressive stress, and wherein an area having a residual stress in the thickness direction of the joining member that is a tensile stress is formed adjacently to (a) the area formed at the central portion in the widthwise direction of the joining member and which has a compressive stress and (b) the area formed at the end portion in the widthwise direction of the joining member and which has a compressive stress.

5. An image display apparatus comprising:
the airtight envelope according to claim 3; and
an image forming member at any one of: (a) the first glass base member and (b) the second glass base member, wherein the image forming member is located in an interior of the airtight envelope.

* * * * *